United States Patent
Harrison et al.

(10) Patent No.: US 12,386,806 B2
(45) Date of Patent: Aug. 12, 2025

(54) HIERARCHY MERGING IN COMPUTER GRAPHICS

(71) Applicant: Imagination Technologies Limited, Kings Langley (GB)

(72) Inventors: Matthew Harrison, Kings Langley (GB); John W. Howson, Kings Langley (GB); Luke T. Peterson, San Francisco, CA (US); Steven J. Clohset, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 377 days.

(21) Appl. No.: 17/726,823

(22) Filed: Apr. 22, 2022

(65) Prior Publication Data

US 2022/0245111 A1    Aug. 4, 2022

Related U.S. Application Data

(63) Continuation of application No. 15/464,729, filed on Mar. 21, 2017, now Pat. No. 11,341,110.

(Continued)

(51) Int. Cl.
*G06F 16/22* (2019.01)
*G06F 7/14* (2006.01)
(Continued)

(52) U.S. Cl.
CPC ............ *G06F 16/2246* (2019.01); *G06F 7/14* (2013.01); *G06T 15/06* (2013.01); *G06T 17/005* (2013.01)

(58) Field of Classification Search
CPC ....... G06F 16/2246; G06F 7/14; G06T 15/06; G06T 17/005

(Continued)

(56) References Cited

U.S. PATENT DOCUMENTS 5,295,243 A * 3/1994 Robertson ........... G06F 3/04815
715/848
8,253,730 B1   8/2012 Carr
(Continued)

FOREIGN PATENT DOCUMENTS

| JP | 2009534759 A | 9/2009 |
| JP | 2011081788 A | 4/2011 |
| WO | 2013022804 A1 | 2/2013 |

OTHER PUBLICATIONS

Decoro et al; "XFASTMESH: Fast View-Dependent Meshing From External Memory"; IEEE Visualization Oct. 27, 2002-Nov. 1, 2002; pp. 363-370.

(Continued)

*Primary Examiner* — Hai Tao Sun
(74) *Attorney, Agent, or Firm* — Potomac Law Group, PLLC; Vincent M DeLuca

(57) ABSTRACT

A hierarchy is a multi-level linked structure of nodes, wherein the hierarchy represents data relating to a set of one or more items to be processed. Where there are multiple input hierarchies, it may improve the efficiency of the processing of the items to merge the input hierarchies to form a merged hierarchy. The hierarchies are merged by identifying two or more sub-hierarchies within the input hierarchies which are to be merged, and determining one or more nodes of the merged hierarchy which reference nodes of the identified sub-hierarchies. The determined nodes of the merged hierarchy are stored and indications of the references between the determined nodes of the merged hierarchy and the referenced nodes of the identified sub-hierarchies are also stored. In this way, the merged hierarchy is formed for use in processing the items.

20 Claims, 10 Drawing Sheets

Related U.S. Application Data

(60) Provisional application No. 62/311,106, filed on Mar. 21, 2016.

(51) Int. Cl.
 *G06T 15/06* (2011.01)
 *G06T 17/00* (2006.01)

(58) Field of Classification Search
 USPC ........................................................ 345/421
 See application file for complete search history.

(56) References Cited

U.S. PATENT DOCUMENTS

| | | | |
|---|---|---|---|
| 8,717,357 B2 | 5/2014 | McCombe et al. | |
| 2005/0017971 A1 | 1/2005 | Ard | |
| 2008/0231633 A1* | 9/2008 | Keller | G06T 15/40 |
| | | | 345/426 |
| 2013/0113800 A1* | 5/2013 | McCombe | G06T 15/06 |
| | | | 345/424 |
| 2014/0136498 A1* | 5/2014 | Finis | G06F 16/2329 |
| | | | 707/695 |
| 2016/0189418 A1* | 6/2016 | Ha | G06T 15/06 |
| | | | 345/426 |

OTHER PUBLICATIONS

Eisemann et al; "Automatic Creation of Object Hierarchies for Ray Tracing of Dynamic Scenes"; WSCG Short Papers Post-Conference Proceed, WSCG; Jan. 1, 2007; pp. 1-8.

Shirley; "Ray Tracing"; Introduction to Realtime Ray Tracing Siggraph 2005—Course 38; Jul. 31, 2005; 39 pages.

Wald et al; "Distributed Interactive Ray Tracing of Dynamic Scenes"; Parallel and Large-Data Visualization and Graphics, IEEE Computer Society; Oct. 20, 2003; pp. 77-85.

(Note: NPL in parent application).

\* cited by examiner

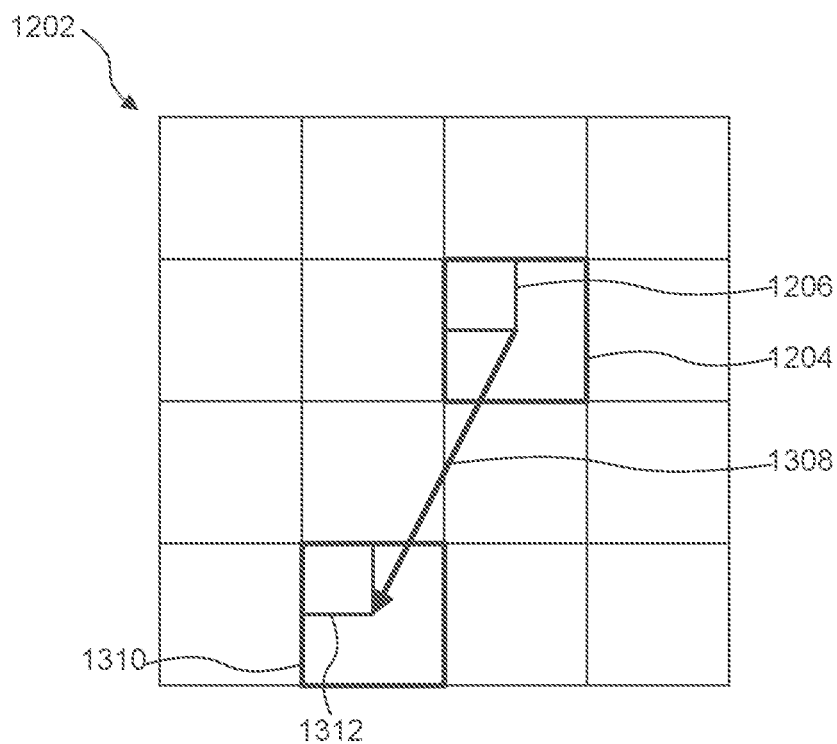
FIGURE 13
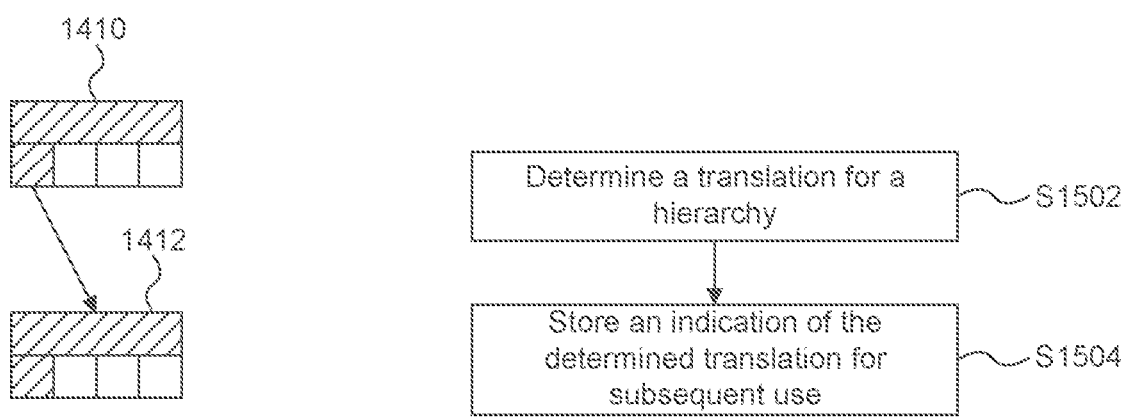
FIGURE 14
FIGURE 15

HIERARCHY MERGING IN COMPUTER GRAPHICS

CROSS-REFERENCE TO RELATED APPLICATIONS AND CLAIM OF PRIORITY

This application is a continuation under 35 U.S.C. 120 of application Ser. No. 15/464,729 filed Mar. 21, 2017, now U.S. Pat. No. 11,341,110, which claims the benefit under 35 U.S.C. 119(e) of Provisional Application Ser. No. 62/311,106 filed Mar. 21, 2016, the contents of which are incorporated by reference herein in their entirety.

BACKGROUND

There are many scenarios in which data structures in the form of hierarchies can be useful for processing data items. In this disclosure the term "hierarchy" refers to a multi-level linked structure of nodes, which represents data relating to a respective set of one or more items to be processed. A hierarchy can be a useful way to represent data where groups of data items are to be processed in a similar manner in dependence on a condition being met. In this case, the hierarchy can include one or more higher level nodes which reference the group of data items, and the higher-level node(s) can be processed to determine whether, and/or how, to process the group of items. Depending on the type of processing that is being performed, this can be more efficient than separately determining for each of the items of the group whether, and/or how, to process those items.

One example in which hierarchies can be particularly useful is when rendering a three dimensional (3D) scene in a graphics processing unit, e.g. by performing ray tracing. Ray tracing methods typically involve performing intersection tests of rays with geometry which is present in the scene. The geometry in the scene describes surfaces of structures in the scene, and the geometry may be represented by primitives. Primitives are often polygons, typically triangles, but may have other forms such as points, lines or patches. Objects in the scene can be composed of one or more such primitives, and in some cases objects may be composed of many thousands, or even millions of such primitives. Scenes typically contain many objects. Ray tracing methods typically involve modelling how light interacts with the primitives in the scene by tracing rays in the scene. A ray can be considered to be a vector of virtual light with an origin and a direction. An intersection testing unit of a ray tracing renderer can determine for each ray, which of the primitives the ray will intersect, if any. One or more shaders can be executed to determine how a ray interacts with an intersected primitive, e.g. based on factors such as material properties of the primitive and the surface normal of the primitive. A result of the execution of the shader may be stored in an accumulation buffer to represent a value of a sample point of an image of the scene which is being rendered. The execution of the shader may result in one or more secondary rays being emitted from the intersected primitive which can be used to determine the appearance of reflections within the scene. For each secondary ray, intersection testing and shading can be performed, and the results of this shading can be combined with results already stored in the accumulation buffer to refine the pixels of the image to include reflections. The method may repeat many times for many reflections of a ray. There may be a maximum number of reflections of a ray that are considered.

As described above, intersection testing in a ray tracing system involves determining which primitives lie along the path of a ray. Rather than testing a ray against each of the primitives, a hierarchy (or "acceleration structure") can be created to represent the primitives in the scene and then a ray can be tested against the hierarchy. An acceleration structure may take the form of a 3-dimensional grid, a tree of splitting planes such as a kd-tree, a hierarchy of bounding volumes such as an axis-aligned bounding box hierarchy, or a geometrically defined structure such as an oct-tree. For example, the hierarchy may have nodes at different levels of the hierarchy, wherein a node may represent a region of space, at a particular resolution, within the 3D extents of the scene being rendered. The node(s) at the top of the hierarchy represent large regions of the space representing the scene, and the nodes at lower levels of the hierarchy represent smaller regions within the space representing the scene. A first node in the hierarchy has references (i.e. links) to other, lower-level nodes in the hierarchy which are contained with the first node. There are references between nodes at different levels of the hierarchy, such that the hierarchy forms a tree-like structure, whereby leaf nodes do not have references to lower nodes. Nodes which are present in the hierarchy represent regions in which primitives are present. For example, a Bounding Volume Hierarchy (BVH) includes nodes of differing sizes, some nodes bound other nodes (representing spatial relationships between nodes in the scene) and they also have parent-child connections, i.e. links, (representing topological relationships in the hierarchy). Intersection testing can be performed by testing the top node(s) of the hierarchy first. If a ray misses a particular node then it is inferred that the ray will miss all of the lower-level nodes which are referenced (directly or indirectly) by the particular node in the hierarchy, without the need to perform intersection testing on those lower-level nodes. If a ray hits a particular node then the intersection testing is performed on the node(s) which are referenced by the particular node. The intersection testing is repeated for appropriate nodes of the hierarchy in order to determine which primitives are intersected by a ray. The intersection testing may then determine which of the intersected primitives will be intersected first by a ray, e.g. by determining which of the intersection points (of the ray with primitives) is closest to the origin of the ray. It can be appreciated that by performing the intersection testing on the hierarchy, rather than immediately on the individual primitives, the number of intersection tests that need to be performed can be significantly reduced.

Although the hierarchy improves the performance of the intersection testing in a ray tracing system, the generation of the hierarchy requires significant processing, and therefore incurs a cost, e.g. in terms of processing power and time. If a ray tracing renderer is rendering a sequence of frames in real-time, the generation of a new hierarchy for each frame can have a significant adverse effect on the performance of the renderer in terms of the speed and quality with which images can be rendered.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In some examples described herein, a plurality of input hierarchies are merged to form a merged hierarchy. The merging of hierarchies may be useful in many different scenarios. As described in detail in examples herein, hierarchies may be merged for use in a ray tracing renderer. In these examples, the merging of the hierarchies means that intersection testing of rays may be performed against fewer hierarchies, which may reduce the amount of processing performed as part of the intersection testing. Furthermore, the process of merging a plurality of hierarchies may be simpler than recreating, from scratch, a unified hierarchy of all of the leaf nodes of the plurality of hierarchies.

For example, there may be provided a method of merging a plurality of input hierarchies to form a merged hierarchy, wherein each of the input hierarchies is a multi-level linked structure of nodes, and wherein each of the input hierarchies represents data relating to a respective set of one or more items to be processed, the method comprising:

identifying two or more sub-hierarchies within the input hierarchies which are to be merged;

determining one or more nodes of the merged hierarchy which reference nodes of the identified sub-hierarchies, wherein at least one of the referenced nodes within at least one of the identified sub-hierarchies references one or more lower-level nodes within said at least one of the identified sub-hierarchies; and storing said one or more determined nodes of the merged hierarchy and storing indications of the references between the determined nodes of the merged hierarchy and the referenced nodes of the identified sub-hierarchies, thereby forming the merged hierarchy for use in processing the items.

The method may be particularly suitable for use in a rendering system, such as a ray tracing rendering system. However, the hierarchy merging method may be used for other purposes as well, such as other types of rendering systems (e.g. rendering systems which are based on rasterization rather than ray tracing), within image or video processing systems (e.g. for use in a camera pipeline), or audio processing systems, to give some examples. The hierarchy merging methods described herein could be used even more broadly; for example, the hierarchy merging method could be used for physics simulations, collision detection, line of sight calculations, radiance transfer, acoustic propagation, fluid and particle systems, and methods that require extracting spatial information from a previous operation like photon mapping, just to name a few.

Even more generally, hierarchies are the most commonly used index structure to perform any kind of lookup where data points aren't evenly distributed in the represented space. This includes multi-dimensional spaces. For example, if data is parameterized into a multi-dimensional vector describing a point, and the data for that point is stored in a database, then the hierarchy merging methods described herein could be useful to efficiently retrieve that data. This is applicable to pattern recognition, as well as other vision and artificial intelligence (AI) algorithms where multi-dimension clustering is performed or nearest neighbour queries are used.

Furthermore, there may be provided a hierarchy merging module configured to merge a plurality of input hierarchies to form a merged hierarchy, wherein each of the input hierarchies is a multi-level linked structure of nodes, and wherein each of the input hierarchies represents data relating to a respective set of one or more items to be processed, the hierarchy merging module comprising:

a merging determination unit configured to:
identify two or more sub-hierarchies within the input hierarchies which are to be merged; and determine one or more nodes of the merged hierarchy which reference nodes of the identified sub-hierarchies, wherein at least one of the referenced nodes within at least one of the identified sub-hierarchies references one or more lower-level nodes within said at least one of the identified sub-hierarchies;

wherein the hierarchy merging module is configured to cause the storage of said one or more determined nodes of the merged hierarchy and indications of the references between the determined nodes of the merged hierarchy and the referenced nodes of the identified sub-hierarchies.

In some examples described herein, respective translations or additional transformations can be determined for hierarchies. This allows spatial positions of objects represented by a hierarchy to be represented by smaller values which, when the values are in a floating point format, increases the precision of the values. The translation may be determined to correctly position the hierarchy, e.g. with respect to worldspace or with respect to other hierarchies. In order for a hierarchy to be correctly processed (e.g. to merge the hierarchy) an indication of the determined translation may be stored. The translation can be determined at the granularity of a voxel relating to a node at a determined level of the hierarchy in order to avoid or reduce splitting of the hierarchy due to the translation.

One embodiment of the invention is a ray tracing system whereby geometric primitive shapes partially defining a plurality of components of a scene are provided, through an API, wherein the coordinate system in which the primitives are represented is specific to each component of the scene. Individual transformations or translations can be subsequently provided for each scene component, and a viewpoint or otherwise specified origin for the scene may be further provided. The ray tracing system can then construct a merged hierarchy including one or more of the scene components, around the specified origin, within which to perform the ray tracing.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 13 shows a translation at the granularity of a top level voxel within a grid of voxels;

FIG. 14 represents nodes of a hierarchy after the translation shown in FIG. 13;

FIG. 15 is a flow chart for a method of determining a translation for a hierarchy;

Figure 1:
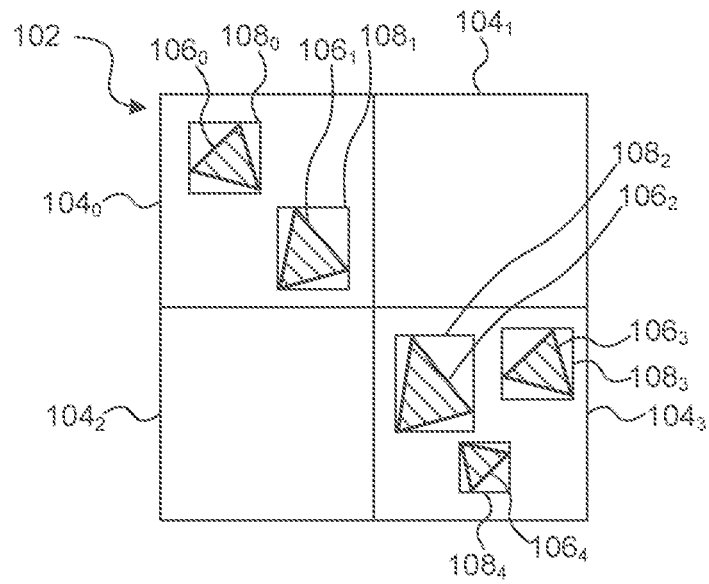
FIG. 1 shows an example of part of a 3D space in which primitives are present.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

As described above, an approach for merging hierarchies is described herein. Many of the examples described herein are in the context of using hierarchies for performing ray tracing to render a scene, but corresponding methods for merging hierarchies could be used in other appropriate situations.

FIG. 1 shows a 2D representation of part of a scene, represented by region 102, which is to be rendered. There may be other similar regions within the scene, which for clarity are not shown in FIG. 1. The regions may, or may not, align with voxels in the scene. Voxels are uniformly sized spatial volumes with addressable locations within the scene. Voxels may be densely packed and are often cubes, but may have other shapes in some examples. In some examples, the regions are boxes, having a cuboidal shape which are described e.g. by a position in space and a size, or by a two or more positions from which the size of the box can be inferred. Several equivalent representations of boxes exist. In this 2D example, the box 102 is aligned with a voxel and is divided into four smaller boxes $104_0$, $104_1$, $104_2$ and $104_3$, which are aligned with lower resolution voxels within the scene. In a 3D example, a voxel may be divided into eight smaller voxels, e.g. by dividing the voxel in half along each axis, and therefore boxes which are aligned to correspond with voxels at one level can be divided into eight smaller boxes which are aligned with voxels at a lower level. Within the part of the scene shown in FIG. 1 five primitives are present, denoted $106_0$ to $106_4$ in FIG. 1. Each of these primitives is bounded by a respective box, denoted $108_0$ to $108_4$. In this example, the boxes 108 are axis-aligned bounding boxes (AABBs) for the respective primitives 106, but they do not necessarily correspond with any particular voxel positions. The boxes 102 and $104_0$, $104_1$, $104_2$ and $104_3$ are also axis-aligned bounding boxes, but these boxes also correspond with voxel positions in this example.

Figure 2:
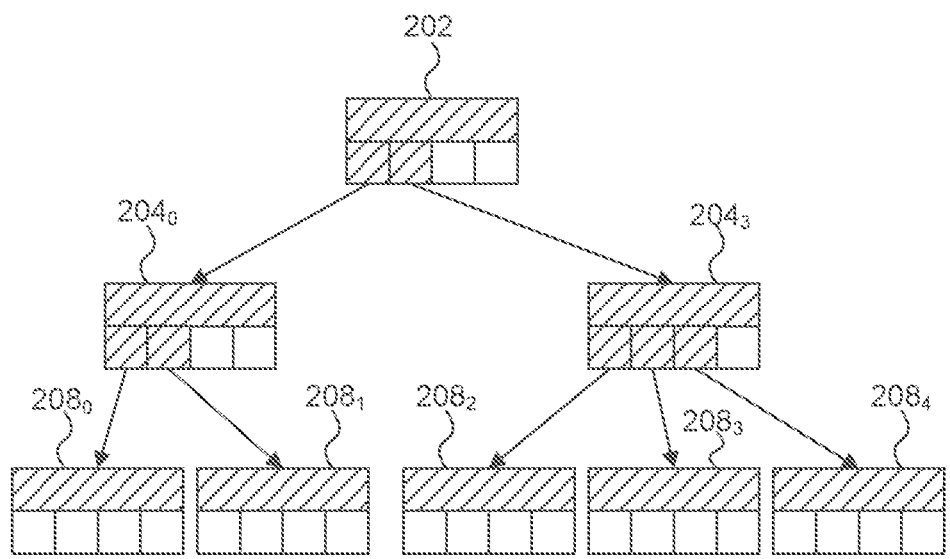
FIG. 2 represents nodes of a hierarchy representing the regions shown in FIG. 1.

FIG. 2 shows an example of a hierarchy which may be generated to represent the boxes shown in FIG. 1. FIG. 2 illustrates the hierarchy as a linked data structure of nodes at different levels. Higher levels in the hierarchy include nodes which represent larger boxes of the space within the scene to be rendered. For example, the highest level node 202 shown in FIG. 2 represents the box 102 shown in FIG. 1. The box 102 bounds four nodes ($104_0$ to $104_3$), but two of those nodes ($104_1$ and $104_2$) do not include any primitives. So on the level below the node 202, the hierarchy includes two nodes: nodes $204_0$ and $204_3$ which respectively represent the boxes $104_0$ and $104_3$ shown in FIG. 1. The box $104_0$ bounds two nodes ($108_0$ and $108_1$), so on the level below the node $204_0$, the hierarchy includes two nodes: nodes $208_0$ and $208_1$ which respectively represent the boxes $108_0$ and $108_1$ shown in FIG. 1. Similarly, the box $104_3$ bounds three nodes ($108_2$, $108_3$ and $108_4$), so on the level below the node $204_3$, the hierarchy includes three nodes: nodes $208_2$, $208_3$ and $208_4$ which respectively represent the boxes $108_2$, $108_3$ and $108_4$ shown in FIG. 1. Each of the nodes of the hierarchy includes data representing a spatial position of a corresponding box within the scene to be rendered. The nodes which are not leaf nodes of the hierarchy also include references to nodes on a lower level of the hierarchy. These references are represented in FIG. 2 by the square sections depicted in each node, and the arrows show the links between the nodes that these references represent. It is noted that in FIG. 2 (and in the similar illustrations of hierarchies in FIGS. 8, 9a and 9b which are described below) the references are shown with arrows from a higher-level node to each of the lower level nodes in the level below, e.g. arrows are shown from node 202 to both the nodes $204_0$ and $204_3$. The hierarchy is represented in this way for ease of understanding, but in some examples, this might not strictly reflect the links between nodes of the hierarchy, in the manner in which they are stored in memory. For example, the structure of the hierarchy may be stored in memory such that a link from a higher-level node (e.g. node 202) to one of the nodes in the level below (e.g. node $204_0$) is stored, and then horizontal links between referenced nodes at that level can be stored, e.g. a link between nodes $204_0$ and $204_3$ may be stored. In this way, there is no direct link between node 202 and node $204_3$, but the reference from node 202 to node $204_3$ can be inferred from the combination of the link between nodes 202 and $204_0$ and the link between nodes $204_0$ and $204_3$. Storing the links in this manner may improve the efficiency of the intersection testing because these links may reflect the order in which the intersection testing is performed on the nodes of the hierarchy. In accordance with this linking structure, in some examples, shallower parts of the subtree can be tested first, i.e. before deeper parts of the hierarchy.

The hierarchy may be built using a sparse oct-tree with voxels at levels of the oct-tree, and wherein voxels of leaf nodes may be shrunk to provide tight bounding box representations of the geometry. For simplicity, the example hierarchy shown in FIG. 2 has just three levels, but in other examples hierarchies may have different numbers of levels, e.g. many more than three levels. For example, a hierarchy may have 32 levels. As an example, moving down a level of the hierarchy means that each voxel is divided in two along each axis, such that each voxel bounds eight voxels at the next level down in the hierarchy, and so if the boxes correspond with the voxels of the oct-tree then each box of the hierarchy may bound eight boxes at the next level down in the hierarchy. Therefore, in an example, the highest level (LOD0) has only one box address in the 3D space of the scene; the next level down (LOD1) has up to 8 boxes; the next level down (LOD2) has up to 64 boxes and so on.

The hierarchy may be built in a top-down manner or in a bottom-up manner. In examples described herein, a bottom-up approach is used to build the hierarchy because a bottom-up hierarchy building algorithm can process the scene geometry in fewer iterations (e.g. in just one pass), whereas a top-down hierarchy building algorithm may need to iterate through the scene geometry many times. A bottom-up hierarchy building algorithm may operate as follows:

1. Iterate through the scene primitives, and when a criterion has been met, create a bounding region to contain a subset of the primitives. This will produce the leaf-nodes that contain the primitives in the scene.
2. Iterate through the leaf-nodes produced in step 1, and when a criterion has been met, create a bounding region to contain a subset of the nodes. These nodes will be larger than the nodes contained within and will comprise the next higher level of the hierarchy.
3. Repeat step 2 until the root of the tree is built. In some examples, the root of the tree is a single node, but in other examples the tree may have multiple root nodes.

Figure 3:
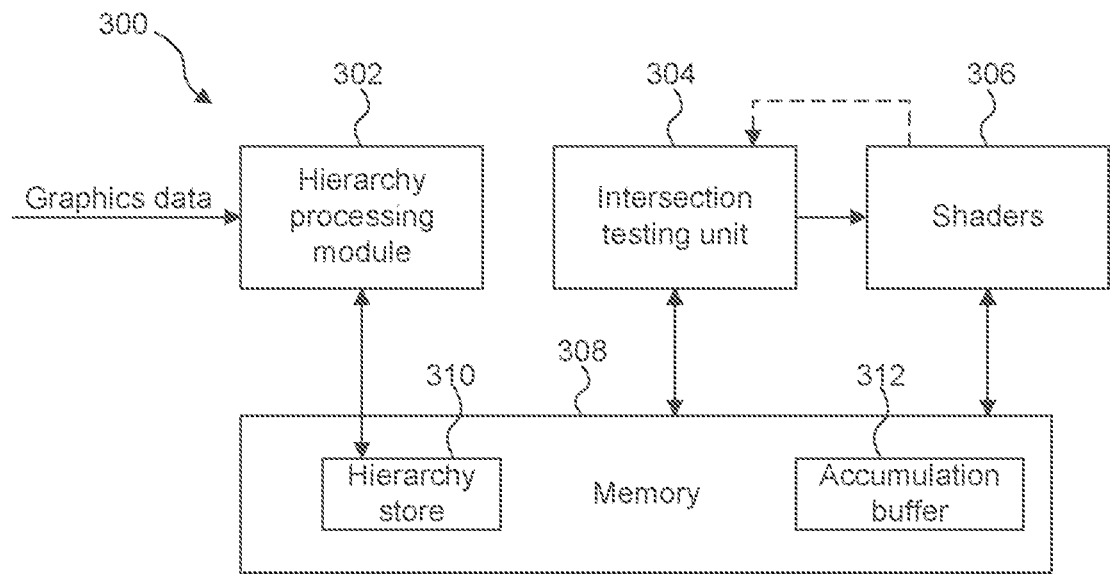
FIG. 3 is a block diagram of components of a ray tracing rendering system.

FIG. 3 illustrates a high-level block diagram of a graphics processing system 300 which can be used to perform ray tracing to render a scene. The graphics processing system 300 comprises a hierarchy processing module 302, an intersection testing unit 304, one or more shaders 306 and a memory 308. The memory 308 includes a hierarchy store 310 and an accumulation buffer 312. The graphics processing system 300 may include other components, but for clarity these are not shown in FIG. 3. Each of the hierarchy processing module 302, the intersection testing unit 304 and the shaders 306 may be implemented in hardware, software or a combination thereof. In one example, the hierarchy processing module 302 and the intersection testing unit 304 may be implemented in dedicated hardware, e.g. implemented as fixed-function circuitry which is configured to perform particular tasks. Implementing these blocks in hardware, rather than software, may improve the performance of these blocks, in terms of higher processing speed, lower processing power, and/or lower on-chip area. In this example, the shaders 306 may be implemented in software which is configured to be executed on processing hardware such as on a Graphics Processing Unit (GPU) or a Central Processing Unit (CPU). Implementing the shaders 306 in software, rather than hardware, provides more flexibility in terms of adapting and refining the functionality of the shaders 306.

An overview of the operation of the graphics processing system 300 for rendering a scene is described with reference to the flow chart of FIG. 4.

Graphics data is received at the graphics processing system 300. In particular the graphics data is received at the hierarchy processing module 302, wherein the graphics data comprises primitives of objects to be rendered in the scene. The hierarchy processing module 302 builds a hierarchy to represent the primitives of the graphics data, as described in steps S402 to S408. Details of how a hierarchy may be built in some examples are described in U.S. Pat. No. 8,717,357.

Some pre-processing may be performed on the primitives prior to step S402. For example, clipping and culling may be performed to remove primitives which lie outside the extents of the scene to be rendered. In step S402 the hierarchy processing module 302 selects a Level of Division (LOD) for each of the primitives. The LOD may be an integer (e.g. between 0 and 31) that describes the level of the sparse oct-tree (which the levels of the hierarchy represent) at which the primitive should exist. The selection of a LOD for a primitive may be based on a heuristic, which may be different in different examples. The precise details of the selection of an appropriate LOD for a primitive are outside of the scope of this disclosure, but as an overview the aim is to contain the primitive in a box (or a plurality of boxes) that is approximately large enough to contain the complete primitive without excessive empty space. For example, these bounding box(es) may be axis-aligned. In cases where the primitive has a large aspect ratio and/or is off-axis (e.g. if the primitive is a long and thin triangle) the objective is to select multiple smaller boxes that collectively cover the surface of the primitive, thereby avoiding the case where the leaf nodes of the hierarchy do not form a tight fit on the primitive. However, in cases where the primitive has a small aspect ratio (e.g. if the primitive is an equilateral primitive) the primitive may be contained within a single box (e.g. an axis-aligned bounding box (AABB)) at the selected LOD.

In step S404 the primitive is added to one or more leaf nodes representing boxes at the LOD that was selected in step S402. The primitive is considered to be present within any box at the selected LOD that the primitive intersects with, even if the primitive does not pass through the centre of the box. If a primitive only partially overlaps a voxel, information may be stored to indicate the amount of the box that is covered by the primitive. In this way, the leaf nodes of the hierarchy can tightly fit the primitives of the geometry in the scene.

After the leaf nodes have been determined, in step S406 the higher levels of the hierarchy are built, e.g. in a bottom-up manner. In this way, nodes at a first level can be grouped together and a node at the next level up can be created which references the group of nodes at the first level. This process may be iterated for all of the nodes at a particular level, and then the process may be iterated for the created nodes, to thereby create the nodes of the next higher level, and so on until the whole hierarchy has been built. The top level of the hierarchy may include a single node. In other examples, the top level of the hierarchy might be at a level which is one level below a level which could include a single node. That is, in some examples, the hierarchy does not need to have a top level which includes a single node, and it may lead to more efficient intersection testing if the top of the hierarchy is one level lower than a level which could include a single, unifying node.

In step S408 the hierarchy processing module 302 passes the hierarchy to the memory 308 for storage in the hierarchy store 310. For ease of understanding, the memory 308 is shown in FIG. 3 as a unified block of memory, but in some examples the memory 308 may be implemented as multiple different blocks of memory, e.g. some of which may be implemented as system memory (e.g. Dynamic Random Access Memory (DRAM)) and some of which may be implemented as on-chip memory. For example, the hierarchy store 310 of the memory 308 may be implemented as on-chip memory, i.e. on the same chip as the hierarchy processing module 302, intersection testing unit 304 and shaders 306.

In step S410 the intersection testing unit 304 performs intersection testing on the hierarchy to determine which primitives are intersected by rays which pass through pixel positions of an image to be rendered. As described above, a ray is a vector defined by an origin and a direction. The ray may also have a clipping distance that sets a maximum distance for the ray from the origin.

The intersection testing is performed by testing the top node(s) of the hierarchy first. If a ray misses a particular node then it is inferred that the ray will miss all of the lower-level nodes which are enclosed by (or "bounded" by) that particular node in the hierarchy, without the need to perform intersection testing on those lower-level nodes. In this way, it can be determined that a ray will miss a whole sub-hierarchy which has the particular node as the root of the sub-hierarchy within the hierarchy by performing intersection testing on the particular node, without performing intersection testing on the other (lower) nodes of the sub-hierarchy. However, if a ray hits a particular node then the intersection testing is performed on nodes which are referenced by the particular node, i.e. on nodes in a sub-hierarchy below the particular node. The intersection testing is performed for appropriate nodes of the hierarchy in order to determine which primitives are intersected by a ray. The intersection testing may determine which of the intersected primitives will be intersected first by a ray, e.g. by determining which of the intersection points of the ray with a primitive is closest to the origin of the ray. Precise details of the intersection testing may be different in different examples.

In step S412 one or more shaders 306 may be executed to determine how rays are to interact with primitives with which they intersect. The interaction of a ray with a primitive may be based on properties of the primitive, e.g. material properties of the primitive and other factors such as the surface normal of the primitive. The shaders 306 may retrieve the properties of the primitives from the memory 308. The shaders 306 may for example be implemented as software programs which are executed on processing units at the graphics processing system 300. This allows the shader programs to be adapted easily so that different effects can be used for interactions between rays and primitives without requiring a change to the hardware.

In step S414 a result of the execution of the shaders 306 is stored in the accumulation buffer 312 to represent a value at a sample point of an image which is being rendered.

Furthermore, the execution of the shaders 306 may result in one or more secondary rays being emitted from the primitive which can be used to determine the appearance of lighting effects, such as reflections, within the scene. These secondary rays are passed back to the intersection testing unit 304 (as shown by the dotted lines in FIGS. 3 and 4). For each secondary ray, intersection testing and shading can be performed, and the results of this shading can be combined with results already stored in the accumulation buffer to refine the sample point values of the image, e.g. to include the effects of reflections in the scene. The method may repeat many times for many reflections of a ray. There may be a maximum number of reflections of a ray that are considered. Furthermore, as described above, the ray may have a clipping distance such that when a ray has travelled as far as the clipping distance it is clipped to stop further repetitions of the ray processing, e.g. for further reflections.

Figure 4:
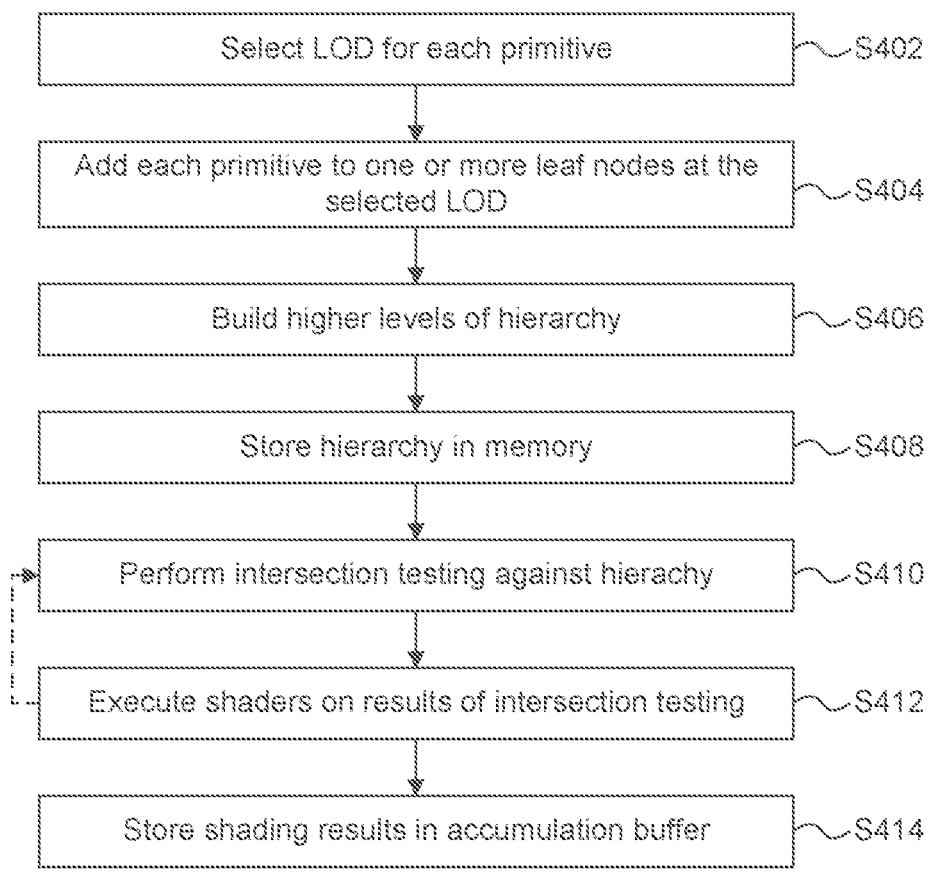
FIG. 4 is a flow chart showing operations performed in a ray tracing rendering system.

Therefore, at the end of the method shown in FIG. 4, the accumulation buffer 312 stores results of the ray tracing which can be used to represent pixel values of an image. The image can then be used as appropriate, e.g. displayed on a display or stored in a memory or transmitted to another device, e.g. over a communications network such as the Internet.

In an example, the scene which is being rendered is a current frame of a sequence of frames. For example, the sequence of frames may be used for real-time animation, e.g. for use with a gaming application where a user interacts with the gaming application in real-time, and the results of the interaction are to be displayed in real-time. In scenarios such as these, a graphics processing system may be adapted to render frames efficiently, e.g. quickly enough for a user not to notice a delay in the rendering and without requiring too much processing to be implemented in a device such as a mobile device e.g. a smart phone or tablet which may have significantly limited processing resources due to constraints of cost, size, weight, battery life, etc.

The building of the hierarchy for the primitives in a scene may take a significant portion of the time taken to implement the ray tracing method. Often, a frame from a sequence of frames includes some objects which have not moved since the preceding frame. In order to reduce the time taken to render a frame of a sequence of frames, a hierarchy for objects which are static between the preceding frame and the current frame, can be reused and therefore is not rebuilt for the current frame. However, for objects which have moved between the preceding frame and the current frame (i.e. for "dynamic" objects) a hierarchy is built for those dynamic objects for the current frame. Therefore, there may be more than one hierarchy representing objects in the current frame. There may be other reasons for having multiple hierarchies representing respective sets of objects in the current frame. For example, as described in more detail below, an object (e.g. a car or building in a game) may always be represented by a particular set of primitives. In this case, hierarchies may be pre-determined separately for different sets of one or more objects, such that those objects can be easily added to a scene, rather than rebuilding the hierarchy every time the objects appear in a frame. In this case, as described in more detail below, translations may be applied to hierarchies, such that spatial positions of all of the hierarchies for a current frame are defined with respect to a common set of axes, e.g. they are all defined in terms of worldspace.

Although having multiple hierarchies may be beneficial in terms of the time and processing power used to generate the hierarchies for a scene, having multiple hierarchies may detrimentally affect the efficiency of the intersection testing in a ray tracing renderer. In particular, the intersection testing would need to be applied to each of the hierarchies which are defined for the scene. This means that the number of intersection tests which are performed is likely to be higher than if a single hierarchy was built for the objects in the scene. As a very simple example to illustrate the point, for a ray in a direction that will miss all of the geometry in the scene, if a single hierarchy is defined then the ray might be tested against the root node of the hierarchy and it may fail the intersection test, in which case no further intersection tests are performed for that ray and it is known that the ray misses all of the primitives in the scene. However, if there are multiple hierarchies, the minimum number of intersection tests that can be performed is to test the ray against each of the root nodes of the hierarchies.

In examples described herein, multiple hierarchies are merged together to form a merged hierarchy. This reduces the number of separate hierarchies for a scene which tends to improve the efficiency of the intersection testing, but does not require a full rebuild of the hierarchy from the geometry in the scene.

Figure 5:
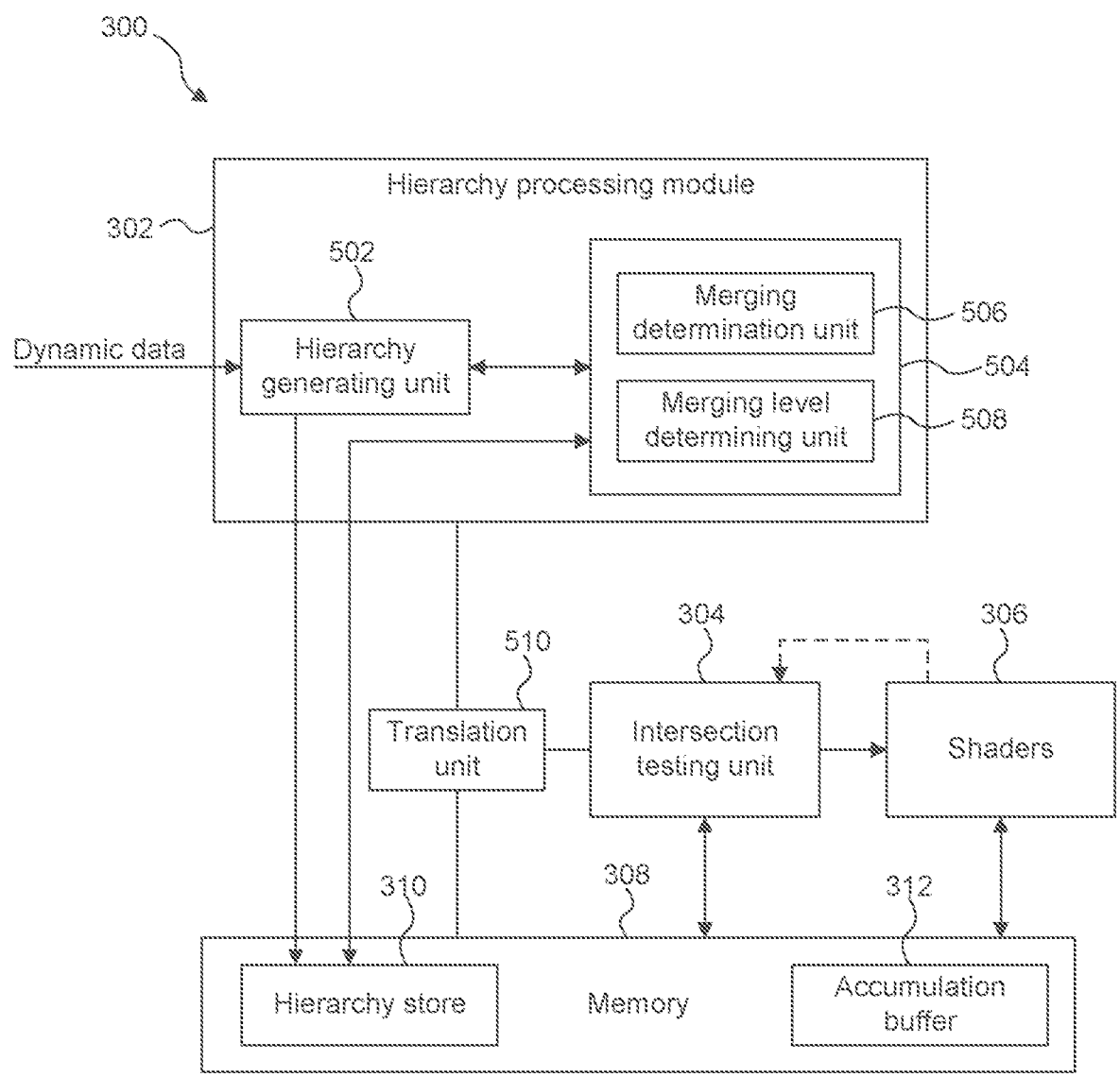
FIG. 5 shows components of a hierarchy processing module within a ray tracing rendering system.

FIG. 5 shows the system 300, but with some further components being shown in FIG. 5 which were not shown in FIG. 3. The hierarchy processing module 302 comprises a hierarchy generating unit 502 and a hierarchy merging module 504. The hierarchy merging module 504 comprises a merging determination unit 506 and a merging level determining unit 508. The system also comprises a translation unit 510. In examples described herein the components of the hierarchy processing module 302 (i.e. components 502, 504, 506 and 508) and the translation unit 510 are implemented in hardware, e.g. as fixed function circuitry, which makes the hierarchy processing module 302 very efficient. In other examples, one or more of the components of the hierarchy processing module 302 or the translation unit 510 may be implemented in software.

Figure 6:
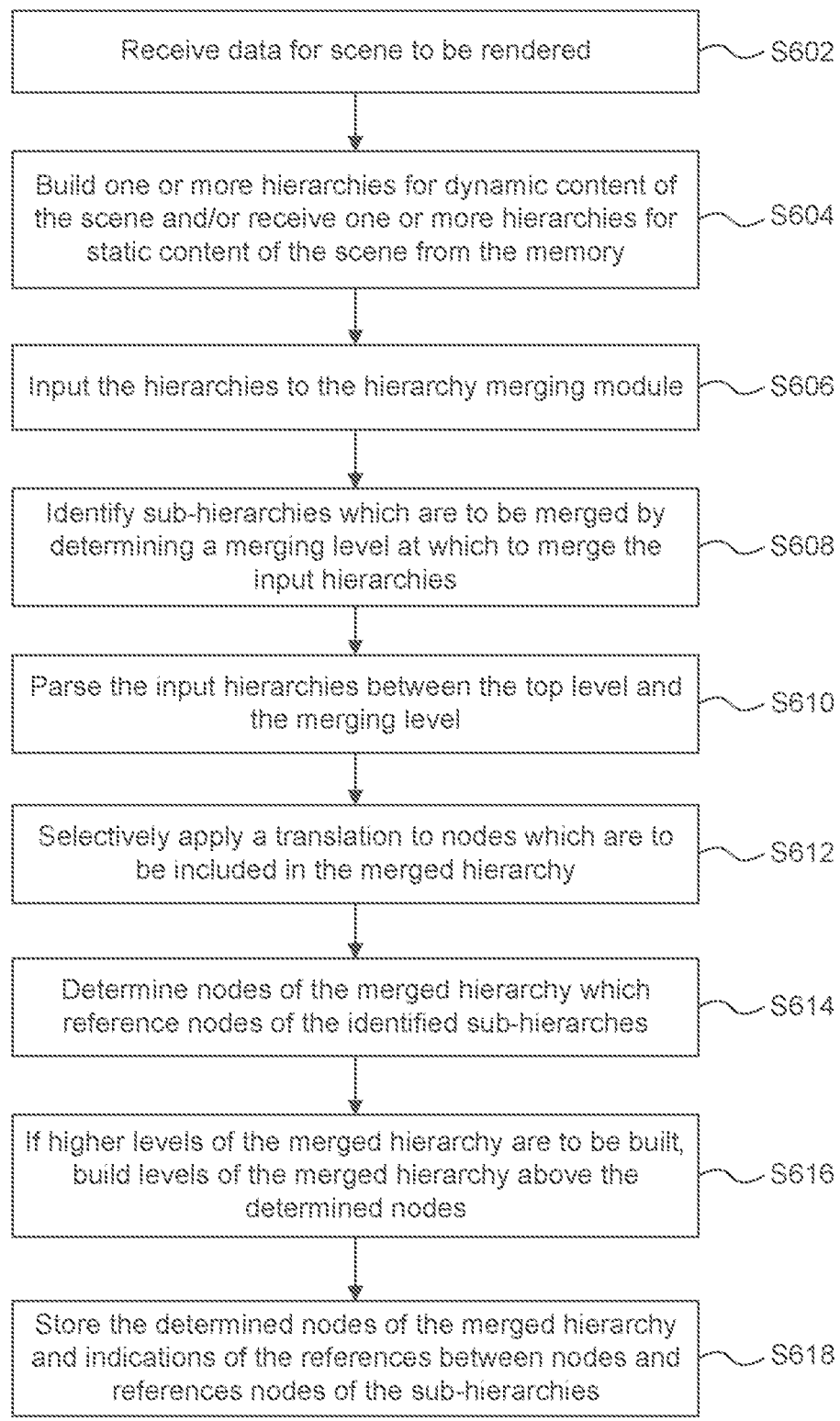
FIG. 6 is a flow chart for a method of merging a plurality of input hierarchies to form a merged hierarchy.

The operation of the hierarchy processing module 302 is described with reference to the flow chart shown in FIG. 6. In step S602 data for the scene to be rendered is received at the hierarchy generating unit 502 of the hierarchy processing module 302. This data is the geometry data (e.g. primitives) which describe objects in the scene.

In step S604 the hierarchy generating unit 502 builds one or more hierarchies for the scene and/or the hierarchy processing module 302 receives one or more hierarchies for the scene. For example, as described above, where the scene is a frame of a sequence of frames, the hierarchy generating unit 502 may build hierarchies for dynamic content in the scene, whilst hierarchies for static content in the scene may be reused from a previous frame (e.g. the immediately preceding frame or other previous frames) and therefore may be retrieved from the hierarchy store 310. The hierarchies can come from several sources, the most common being previous frames, but also they could be built offline and included with the game assets, or built on another hierarchy building module as part of a distributed hierarchy building system. Hierarchies which are built by the hierarchy generating unit 502 may be stored in the hierarchy store 310 for subsequent use.

Following step S604 the hierarchy processing module 302 has access to multiple hierarchies (e.g. generated by the unit 502 and/or retrieved from the memory 308), and in step S606 these hierarchies are input to the hierarchy merging module 504. The hierarchy merging module 504 operates to merge the input hierarchies to form a merged hierarchy.

For ease of understanding, the operation of the hierarchy merging module 504 is described, with reference to FIGS. 7 to 10, in relation to a simple example in which two input hierarchies are merged, but the same principles can be used in other examples to merge more than two input hierarchies.

Figure 7:
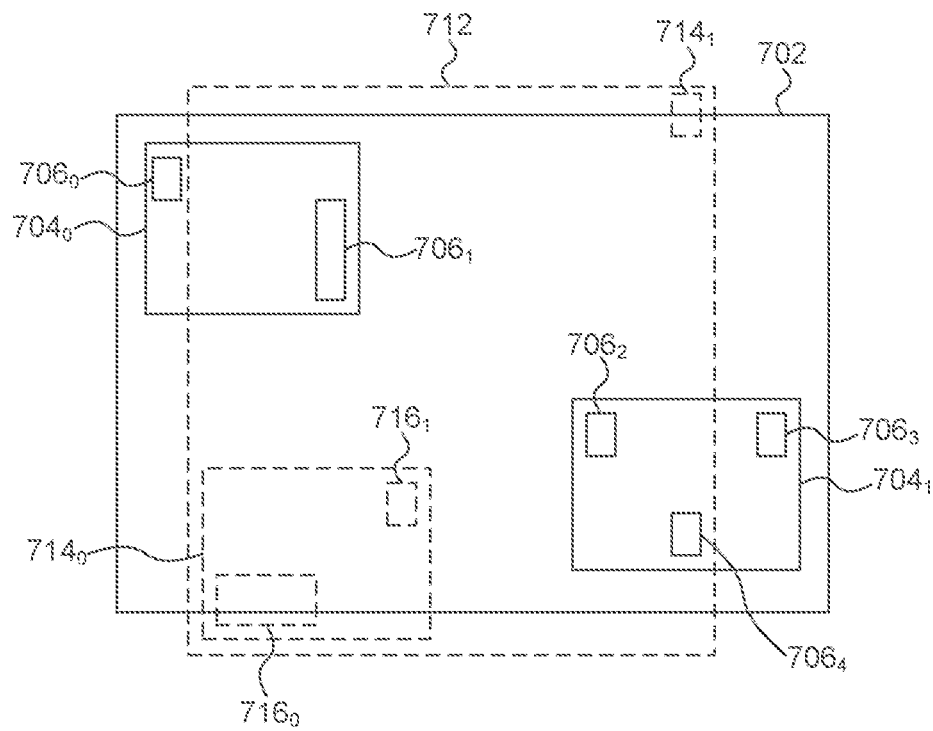
FIG. 7 is an example of regions which are represented by nodes within two input hierarchies.
Figure 8:
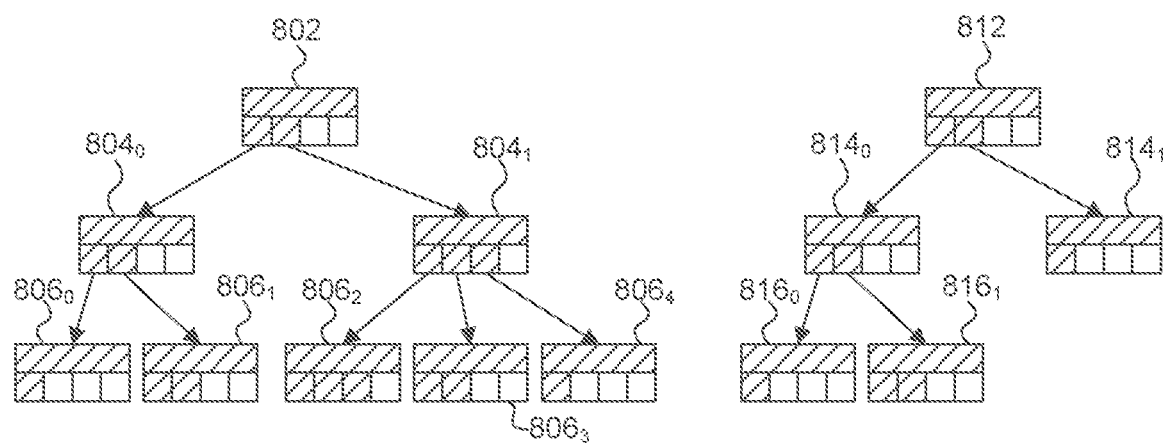
FIG. 8 shows the two input hierarchies which represent the regions shown in FIG. 7.

FIG. 7 shows boxes which are represented by nodes within two input hierarchies, and FIG. 8 shows the two input hierarchies which represent the boxes shown in FIG. 7. In particular, FIG. 7 shows boxes relating to a first hierarchy in solid lines. These boxes include a high level box 702, two medium level boxes $704_0$ and $704_1$ and five low level boxes $706_0$, $706_1$, $706_2$, $706_3$ and $706_4$. The box 702 entirely bounds the boxes $704_0$ and $704_1$, such that if a ray does not intersect box 702 then it is known that the ray does not intersect boxes $704_0$ or $704_1$ without performing intersection tests specifically for the boxes $704_0$ or $704_1$. Similarly, the box $704_0$ entirely bounds the boxes $706_0$ and $706_1$, such that if a ray does not intersect box $704_0$ then it is known that the ray does not intersect boxes $706_0$ or $706_1$ without performing intersection tests for the boxes $706_0$ or $706_1$. Similarly, the box $704_1$ entirely bounds the boxes $706_2$, $706_3$ and $706_4$. This first hierarchy is represented by the left hand section of nodes shown in FIG. 8. In particular, the nodes 802, $804_0$, $804_1$, $806_0$, $806_1$, $806_2$, $806_3$ and $806_4$ respectively represent boxes 702, $704_0$, $704_1$, $706_0$, $706_1$, $706_2$, $706_3$ and $706_4$ shown in FIG. 7.

FIG. 7 shows boxes relating to a second hierarchy in dashed lines. These boxes include a high level box 712, two medium level boxes $714_0$ and $714_1$ and two low level boxes $716_0$ and $716_1$. The box 712 entirely bounds the boxes $714_0$ and $714_1$, such that if a ray does not intersect box 712 then it is known that the ray does not intersect boxes $714_0$ or $714_1$ without performing intersection tests specifically for the boxes $714_0$ or $714_1$. Similarly, the box $714_0$ entirely bounds the boxes $716_0$ and $716_1$, such that if a ray does not intersect box $714_0$ then it is known that the ray does not intersect boxes $716_0$ or $716_1$ without performing intersection tests for the boxes $716_0$ or $716_1$. This second hierarchy is represented by the right hand section of nodes shown in FIG. 8. In particular, the nodes 812, $814_0$, $814_1$, $816_0$ and $816_1$ respectively represent boxes 712, $714_0$, $714_1$, $716_0$ and $716_1$ shown in FIG. 7.

As an example, one of the hierarchies shown in FIG. 8 may be for static objects in the scene, and may be reused from a previous frame, whilst the other one of the hierarchies may be for dynamic objects in the scene. There may be other reasons why the hierarchies have been built separately. It can be seen from FIG. 7 that the two hierarchies have a high degree of spatial overlap at the highest level, i.e. voxels 702 and 712 have a high degree of spatial overlap.

The two hierarchies are input to the hierarchy merging module 504. In step S608 the hierarchy merging module 504 identifies sub-hierarchies within the input hierarchies which are to be merged. For example, the sub-hierarchies may be identified based on the amount of spatial overlap of the sub-hierarchies from the input hierarchies. Each sub-hierarchy is a subsection of a hierarchy. In these examples sub-hierarchies are found from the input hierarchies which have a high degree of spatial overlap (e.g. the spatial overlap of the boxes of the top level of the sub-hierarchies is greater than a threshold (such as 50%) of the total volume of those boxes of the sub-hierarchies). This provides an indication that the sub-hierarchies are suitable for merging. In the example shown in FIGS. 5 and 6, in order to identify the sub-hierarchies, the merging level determining unit 508 determines a merging level at which the sub-hierarchies are to be merged, thereby identifying root nodes of the sub-hierarchies at the merging level. The merging level may be defined in terms of a level of the oct-tree at which the boxes represented by the nodes of the hierarchies are defined. The determination of the merging level may be based on the amount of spatial overlap of nodes from the input hierarchies at different levels. For example, the merging level may be determined to be the lowest level at which the amount of spatial overlap of nodes from the input hierarchies is above a threshold, e.g. when the boxes relating to nodes from the input hierarchies at a particular level overlap with each other by more than 50%. The sub-hierarchies descend from the identified nodes at the merging level. In the example shown in FIGS. 7 and 8, the merging level determining unit 508 will determine that the merging level is to be the top of the three levels shown in FIG. 8. This is because the top level nodes 802 and 812 relate to boxes 702 and 712 which have a high degree of spatial overlap, whereas the boxes relating to lower level nodes of the input hierarchies do not overlap with each other. The determined merging level is provided to the merging determination unit 506.

In other examples, the merging level may be determined in a manner which is not based on the spatial overlap of boxes from the input hierarchies. For example, the merging level may be determined to be a predetermined number of levels from the top level of the input hierarchies. In other examples, the merging level may be determined to be a predetermined proportion of the total number of levels in the input hierarchies from the top level of the input hierarchies. In further examples, the merging level may be specified by a user, such that the merging level is determined to be a user-specified level.

Furthermore, in some examples, a merging level is not necessarily determined, and the nodes of the sub-hierarchies which are to be merged are not necessarily at the same level within the input hierarchies. In this case the root nodes of the sub-hierarchies may be determined based on the spatial overlap of the nodes from the different hierarchies, irrespective of the level at which those nodes reside in the hierarchies. This provides a more flexible method for allowing merging of sub-hierarchies from different levels within different input hierarchies.

In step S610 the merging determination unit 506 parses the input hierarchies between the top level and the roots of the identified sub-hierarchies (e.g. at the merging level) to identify leaf nodes existing in those levels of the input hierarchies. Any identified leaf nodes are to be included in the merged hierarchy.

The hierarchies may have their spatial positions defined in terms of different sets of axes. For example, a hierarchy for a set of dynamic objects may have spatial positions defined with respect to a centre position of the set of objects. In order to place that set of objects into scene space (or "world-space") the merging determination unit 506 may apply a translation to the spatial positions of a hierarchy in accordance with a translation which has been determined for the hierarchy by the translation unit 510, as described in more detail below. Once the nodes of the hierarchy have been translated to scene space they can be merged with other hierarchies which have spatial positions defined in that space. An indication of a translation for a hierarchy may be determined for each of the input hierarchies by the translation unit 510.

In step S612 if a translation is indicated for an input hierarchy, then the merging determination unit 506 applies a translation to any leaf nodes identified in step S610 and to any nodes at the merging level of the input hierarchy. In this way, the spatial positions of boxes relating to nodes from different input hierarchies are defined in terms of the same set of axes, such that they can be merged correctly. It is noted that some input hierarchies will not need a translation, and in some cases none of the input hierarchies will need a translation and in those cases step S612 might not be performed.

Figure 9A:
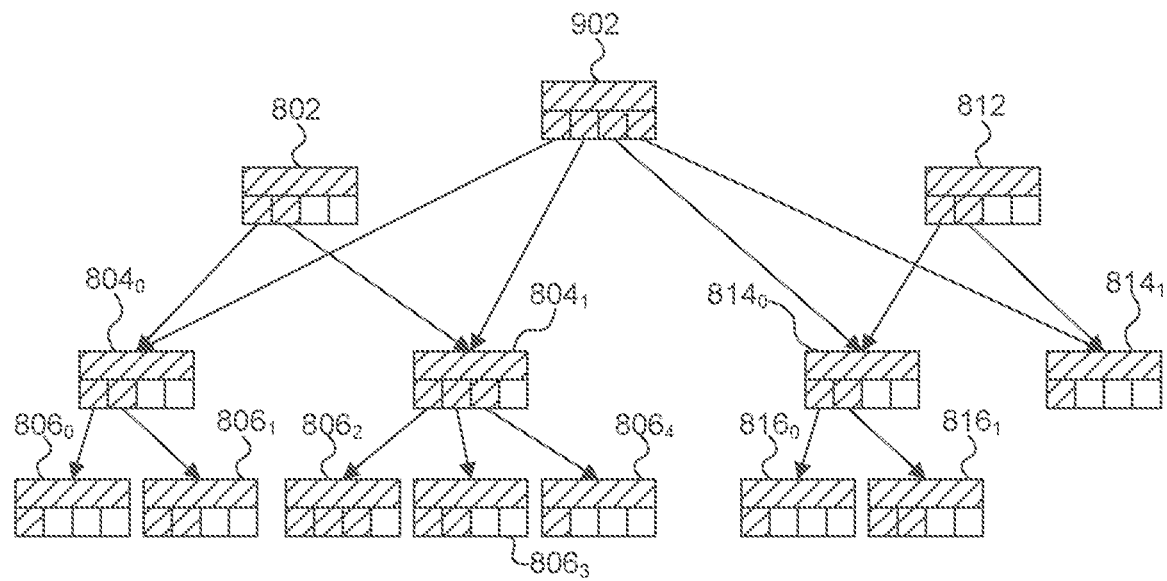
FIG. 9a illustrates the addition of a node of a merged hierarchy to merge the two input hierarchies.

In step S614 the merging determination unit 506 determines one or more nodes of the merged hierarchy. The determined nodes of the merged hierarchy reference nodes of the identified sub-hierarchies in the input hierarchies, e.g. at a level which is one level below the merging level. For example, FIG. 9a shows a node 902 which has been determined to merge the two input hierarchies shown in FIG. 8. In this simple example, just one node is determined in step S614, but it can be appreciated that in other examples more nodes of the merged hierarchy may be determined in step S614. As described above, the merging level was determined to be the level at which nodes 802 and 812 reside in the input hierarchies. Therefore, the determined node 902 references the nodes $804_0$, $804_1$, $814_0$ and $814_1$ which reside in the level one below the merging level in the input hierarchies. These references are denoted with the arrows from node 902 in FIG. 9a.

In step S616, if higher levels of the merged hierarchy are to be built then the hierarchy merging module 504 provides the determined nodes of the merged hierarchy to the hierarchy generating unit 502 which then builds one or more levels of nodes of the merged hierarchy above the nodes which were determined in step S614. The building of the higher levels of the merged hierarchy can be performed in the same way that the hierarchy generating unit 502 builds hierarchies for dynamic data, e.g. in a bottom-up manner. The top level of the resulting merged hierarchy may include a single node. Alternatively, the top level of the merged hierarchy may include more than one node. Having a single node in the top level of the hierarchy would mean that the minimum number of intersection tests which are performed to test a ray against the merged hierarchy would be one, whereas if the top level of the merged hierarchy includes more than one node then the minimum number of intersection tests which are performed to test a ray against the merged hierarchy would be more than one. However, if almost all of the rays will pass the intersection test against the single node of the top level of the merged hierarchy then the total number of intersection tests that are performed against the hierarchy may be increased by including the top level rather than having the top of the hierarchy at one level lower than the level at which a single node could be included in the merged hierarchy. Therefore, if the nodes of the merged hierarchy are spread across a very large proportion of the scene then a level of the merged hierarchy which included a single node would correspond to a box covering a very large proportion of the scene. Therefore, a very large proportion of the rays will pass an intersection test against this single node, such that not much information is gained by including this single node in the merged hierarchy, and it may in fact be beneficial (in terms of the number of intersection tests which are performed against the merged hierarchy) to have the top level of the merged hierarchy set at one or more levels below the level at which a single node could be included.

In the simple example shown in FIG. 9a, only one node (node 902) of the merged hierarchy is determined in step S614, so there are no more levels of the merged hierarchy to build above node 902 in step S616.

Figure 9B:
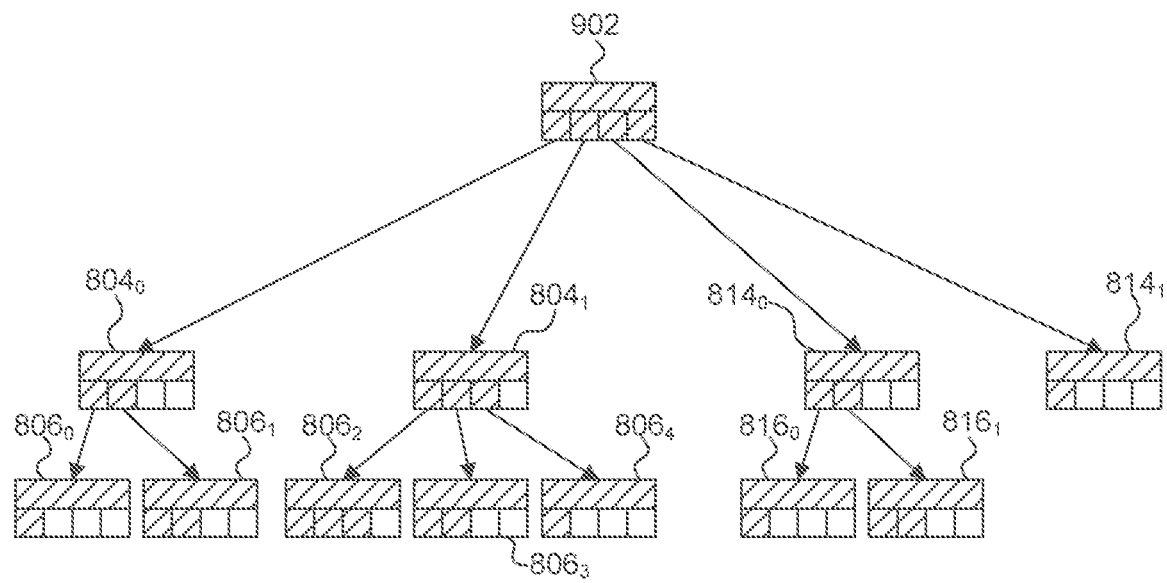
FIG. 9b is a simplified diagram of FIG. 9a which does not show nodes of the input hierarchies which are bypassed in the merged hierarchy.

The nodes of the input hierarchies which are at, or above, the merging level are not needed for intersection testing against the merged hierarchy. A simplified view of the merged hierarchy is shown in FIG. 9b. The references from the node 902 bypass the nodes of the input hierarchies which are at or above the merging level. Therefore, when intersection testing is performed, it is the hierarchy structure shown in FIG. 9b against which rays are tested for intersection. If a ray fails an intersection test against node 902, then no further intersection tests need to be performed for that ray against any of the other nodes shown in FIG. 9b.

Figure 10:
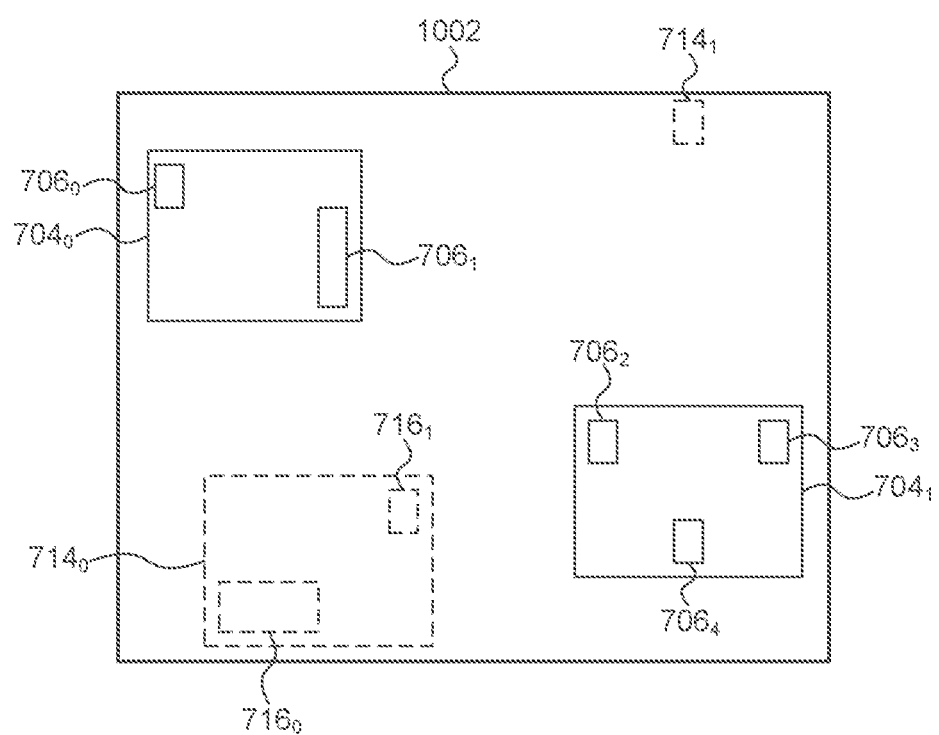
FIG. 10 shows voxels which are represented by the nodes of the merged hierarchy shown in FIG. 9b.

FIG. 10 shows boxes which are represented by the nodes of the merged hierarchy shown in FIG. 9b. Box 1002 corresponds to node 902 of the merged hierarchy. The other boxes shown in FIG. 10 are the same as the corresponding boxes shown in FIG. 7. It can be seen that the box 1002 bounds all of the other boxes shown in FIG. 10, such that intersection testing can be successfully performed against the merged hierarchy shown in FIG. 9b.

In step S618 the hierarchy merging module 504 causes the one or more determined nodes of the merged hierarchy which have been determined in step S614 or step S616 to be stored in the hierarchy store 310. Furthermore, the hierarchy merging module 504 causes indications of the references between the determined nodes of the merged hierarchy and the referenced nodes of the input hierarchies (as well as references between nodes of the merged hierarchy when multiple levels of the merged hierarchy have been built) to be stored in the hierarchy store 310. In relation to the example shown in FIGS. 7 to 10, step S618 involves storing the node 902 and the references from the node 902 to the nodes $804_0$, $804_1$, $814_0$ and $814_1$ in the hierarchy store 310. The data for a node includes data defining the spatial position of the box represented by the node. If the node is a leaf node, references to lower nodes are not stored (because there are no lower referenced nodes in the hierarchy), but indications of one or more primitives are stored with a leaf node to indicate which primitives are present within the box represented by the leaf node.

Once the merged hierarchy has been stored in the hierarchy store 310, ray tracing may be performed using the merged hierarchy to render the scene, e.g. according to steps S410, S412 and S414 described above and shown in FIG. 4, including performing intersection testing of rays against nodes of the merged hierarchy.

Although, as described above, the nodes of the input hierarchies which are at, or above, the merging level (e.g. nodes 802 and 812) are not needed for intersection testing against the merged hierarchy, the input hierarchies may be maintained in the hierarchy store 310 in the memory 308 because they may be used for a subsequent frame. Therefore, the input hierarchies are stored in memory, and additionally the determined nodes of the merged hierarchy and their references are stored in memory.

In some examples, all of the input hierarchies in a scene may be merged into a merged hierarchy. In other examples, a subset of the input hierarchies in a scene may be merged into a merged hierarchy. Furthermore, in some examples, the input hierarchies for a scene may be merged into more than one merged hierarchy. One or more merged hierarchy may be determined for each frame of a sequence of frames.

The methods described above with reference to the flow chart of FIG. 6 cause a merged hierarchy to be formed and stored in the hierarchy store 310 for two or more input hierarchies. If at least one of the nodes of the input hierarchies, which is referenced by a determined node of the merged hierarchy, itself references one or more lower-level nodes within the input hierarchy then the merging of the hierarchies is less likely involve less processing than rebuilding a hierarchy from all of the leaf nodes of the input hierarchies. That is, the lower structure of the identified sub-hierarchies of the input hierarchies is maintained in the merged hierarchy and does not need to be recalculated.

In the examples described above the hierarchies are box hierarchies such that the nodes of the hierarchy represent respective boxes, and in the examples described above the nodes represent axis aligned bounding boxes (AABBs) e.g. at different levels corresponding to levels of an oct-tree structure. In an oct-tree structure, moving down a level means dividing the boxes in half along each axis (e.g. along the x, y and z axes) such that each box at a level of the oct tree bounds eight boxes at the next level down. In other examples, the structure of the boxes represented by the nodes might not be an oct-tree, and may instead be more flexibly defined, but the hierarchies have the property that where a first node in a first level of the hierarchy references one or more nodes in a lower level, the box represented by the first node entirely bounds the box(es) of the node(s) at the lower level. In this way, a test (e.g. an intersection test) can be performed on the first node at the first level and the results of that test can be used to infer results for the referenced nodes in the lower level.

The methods described above relate to the use of hierarchies in a ray tracing renderer for rendering a scene. However, corresponding methods can be used in other contexts in which it may be beneficial to merge two or more input hierarchies. For example, the merging of hierarchies may be used in rendering systems other than ray tracing renderers, or in audio processing systems, or any other processing system in which hierarchies may be used to represent data relating to a respective set of one or more items to be processed, whereby the multi-level linked structure of the nodes in the hierarchy can be used to simplify the processing of the items. Hierarchies can be useful when data items can be grouped together based on some property of the data items, such as spatial position as in the examples given above, or a position in some other "space" such as frequency space, colour space, or 4-D spacetime, etc. The hierarchy then allows a hierarchical processing of the data items based on the property of the data items by processing the nodes of the hierarchy in a top-down manner. For example, if camera pixel values where grouped into nodes of a hierarchy based on the position of the pixel values in a colour space (e.g. RGB space or YUV space, etc.) then if a processing operation intends to process pixels from different sections of colour space differently the hierarchy can be useful for quickly determining how the pixels are to be processed. There are many examples of suitable properties of data items which could be used to group data items together into a hierarchical structure. Furthermore, there are many different scenarios in which multiple hierarchies might exist, and where it may improve processing efficiency to merge the hierarchies, and the methods described herein for merging input hierarchies can be used. Generally, the methods described above, when abstracted from a ray tracing context, provide for merging a plurality of input hierarchies to form a merged hierarchy where each of the input hierarchies represents data relating to a respective set of one or more items to be processed, and each of the input hierarchies is a multi-level linked structure of nodes. The merged hierarchy which is formed can be used in processing the items. The merging of multiple hierarchies to form fewer hierarchies (e.g. to form a single merged hierarchy) may improve the efficiency with which the items are processed.

In the examples described above, separate hierarchies may be defined for separate sets of objects, e.g. different characters or objects in a game may have different respective predetermined hierarchies. The spatial positions of objects may be defined in a floating point format. Problems of accuracy may occur if the positions of the objects are defined in terms of worldspace axes. This is because the distance of an object form the origin of the worldspace axes may be significantly larger than the size of the object, such that the floating point values representing the position of the object may be large compared to the size of the object. Each time a floating point number increases over a power of two boundary its precision is halved, so using larger floating point numbers to represent positions will reduce the accuracy with which those positions are defined.

As a simple example, in a game application, two characters may be 3 metres apart moving at the same speed along a line away from the origin (0.0f, 0.0f, 0.0f) in worldspace. With each power-of-two boundary that the position values cross as the characters move away from the origin, the precision of the floating point numbers representing the position drops (in particular the precision halves for each power-of-two boundary crossed). Eventually the positions of the two characters will be indistinguishable due to precision errors. This is an extreme example, but it illustrates the precision errors that can occur due to positions being defined in terms of worldspace axes when the objects are far from the origin. Another example where this might cause a problem is when two triangular primitives describe a single quad. In this case, if the precision deteriorates such that a gap can be seen between the shared edge between the two primitives the illusion of a quad is immediately lost as the two independent triangles become apparent. The errors in precision can cause other problems in other examples.

In order to reduce the precision errors that occur, the size of the worldspace can be constrained such that there is an upper limit to the position values that can define positions in the scene. In other words, the extents of the scene can be set, whereby geometry stays within the scene extents. Another way to reduce the precision errors that occur if an object is unacceptably far from the world space origin is to relocate the origin such that position values for the object are defined with smaller (and therefore more precise) floating point numbers.

When a scene being rendered is a current frame from a sequence of frames, and some of the geometry in the scene is static geometry, then it can be problematic to relocate the origin of the current frame because the static geometry has positional data defined in terms of the origin of the previous frame. Therefore, if the origin for the current frame is relocated, the static and dynamic objects may have positions defined in terms of different origins, which can cause problems, e.g. when performing intersection testing on the primitives of the objects in the scene.

So, rather than relocating the origin for a current frame, an offset (i.e. a translation) can be determined for each hierarchy, i.e. for each set of objects. This allows the position values for objects to be defined in terms of a translated origin (i.e. there may be a "fluid" origin for the position values for a set of objects), such that smaller (and therefore more precise) floating point numbers can be used to define the spatial positions of the objects. An indication of the translation for a hierarchy is stored. Then the hierarchies can be processed, and if the spatial position of the objects represented by the hierarchy is to be processed, then the indication of the translation for the hierarchy can be used accordingly. Since each hierarchy can have a respective translation determined for it, the precision of the position values for each hierarchy can be maintained, but the hierarchies can be processed together (e.g. merged) based on knowledge of the translations determined for the respective hierarchies.

The translation unit 510 may determine a translation for a hierarchy. In particular, according to the flow chart shown in FIG. 15, in step S1502, the translation unit 510 determines a translation for a hierarchy. Then in step S1504 the translation unit 510 causes an indication of the determined translation for the hierarchy to be stored for subsequent use, e.g. in a table within the translation unit 510 or in memory 308.

The translation for a hierarchy is determined in step S1502 at the granularity of a voxel relating to a node at a determined level of the hierarchy. The determined level of the hierarchy may, for example, be the top of the hierarchy or a level of the hierarchy (referred to as the "merging level" above) at which the hierarchy is to be merged with another hierarchy. This can help to reduce growth in the hierarchy (in terms of the number of nodes of the hierarchy due to the translation). Determining the translations to have voxel-aligned representations can help to reduce the complexity in determining the translations and reduce the amount of data used to indicate the translation that has been applied. For example, a LOD level and indication of a shift at the granularity of that LOD level in x, y and z directions can define the translation.

Figure 11:
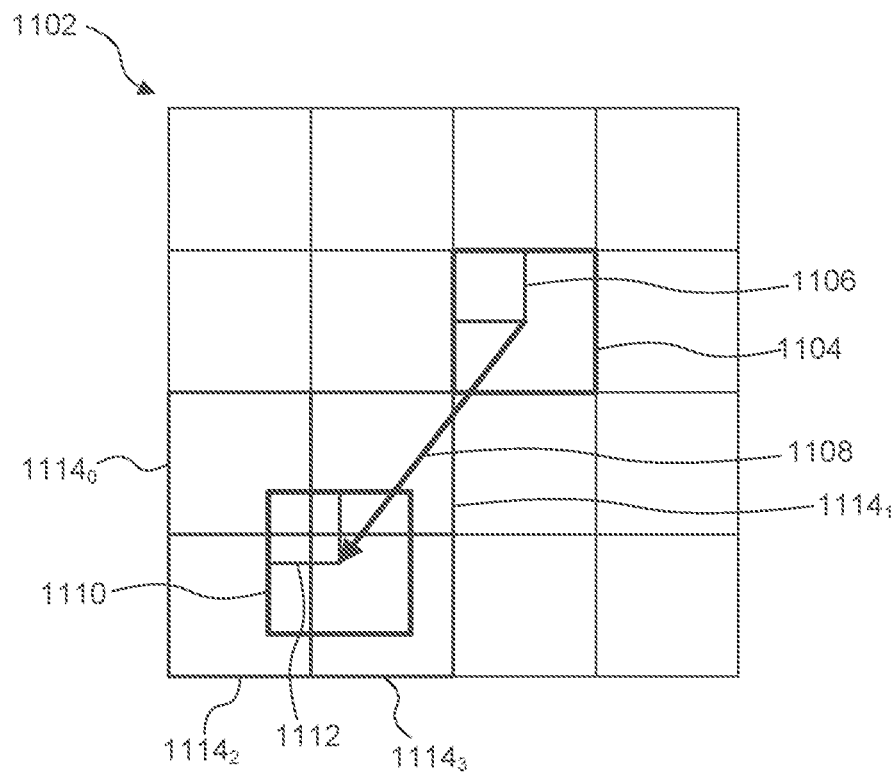
FIG. 11 shows a translation within a grid of voxels.
Figures 12A, 12B:
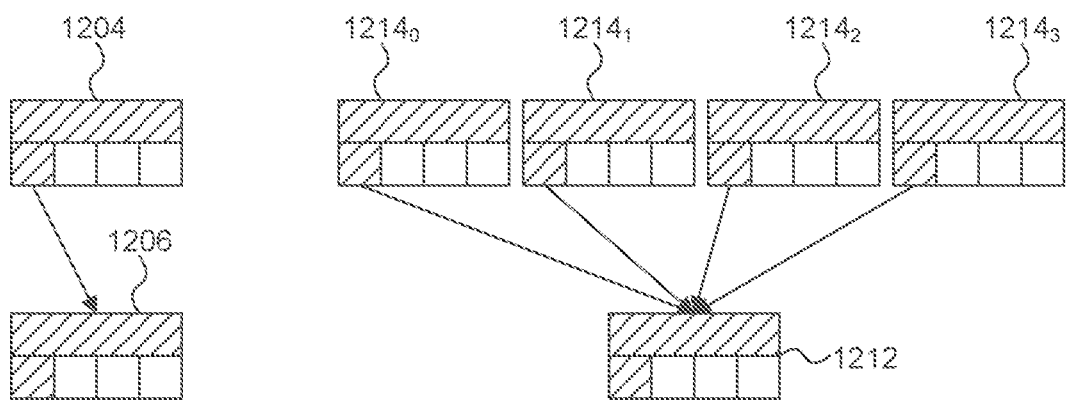
FIG. 12a represents nodes of a hierarchy before the translation shown in FIG. 11.
FIG. 12b represents nodes of a hierarchy after the translation shown in FIG. 11.

FIG. 11 shows an example in which a translation is determined at the lowest possible level (e.g. at a pixel level), such that the translation provides an optimum reduction in the position values used for the objects of the hierarchy. FIG. 11 is shown, for simplicity, in 2D, although the same principles can be applied to further dimensions. In particular, FIG. 11 shows a 4×4 section of a voxel grid 1102 representing space within a scene to be rendered. Geometry relating to a hierarchy is contained within voxel 1104, which bounds a lower-level voxel 1106 which includes geometry. FIG. 12a shows part of the hierarchy, which includes a node 1204 to represent the voxel 1104 and a lower level node 1206 to represent the voxel 1106. The node 1204 has a reference to node 1206. A translation, represented by the arrow 1108, is determined for the hierarchy which would move the hierarchy to a position 1110. The translation 1108 may allow for a good reduction in the values used to represent the spatial position of the hierarchy, such that the spatial position can be defined with high precision. However, it can be seen that the position 1110 is not aligned to the voxel grid. As such, the position 1110 spans four voxels at the level of the hierarchy which includes the original voxel 1104. That is, the box 1104 covers just one voxel grid position whereas the box at position 1110 covers four voxel grid positions, denoted $1114_0$, $1114_1$, $1114_2$ and $1114_3$ in FIG. 11. In other words, the translation has left the box 1110 badly aligned to the voxel grid 1102. For three dimensional translations, up to eight voxels may be covered when a box is translated.

FIG. 12b shows the resulting hierarchy. Nodes $1214_0$ to $1214_3$ represent boxes within the voxels $1114_0$ to $1114_3$. Each of these nodes has a reference to the child node 1212, which corresponds to the lower-level box 1106, now translated to position 1112. It can be seen that this translation has expanded the hierarchy (i.e. increased the number of nodes in the hierarchy). This may be detrimental since more intersection tests may be performed as a result of the expansion of the hierarchy. For example, if a ray test passes against the multiple parents of the child node 1212, multiple identical intersection tests against the node 1212 may be scheduled. This would be inefficient in a ray tracing rendering system, whilst designing hardware to detect and avoid duplicate pathing through a hierarchy may be prohibitively costly in terms of processing power, time and/or silicon area.

To avoid this problem, the translation is determined at the granularity of the voxel grid at a determined level. This may mean that a slightly sub-optimal translation is performed such that position values relative to the translated origin are not quite as small as they could be, but it reduces or avoids the expansion of the hierarchy due to a translation. FIG. 13 shows the same voxel-aligned box 1204 which contains the same lower-level voxel-aligned box 1206 which corresponds to the hierarchy shown in FIG. 12a. However, this time, a different translation (shown with the arrow 1308) is performed such that the translated box is aligned to the voxel grid at the position of box 1310. Voxel-aligned box 1310 includes the lower-level voxel-aligned 1312 which corresponds with the untranslated box 1206. FIG. 14 shows the hierarchy for the translated boxes. A node 1410 represents the box 1310 and a node 1412 represents the box 1312. The node 1410 has a reference to the node 1412. It can be seen that the hierarchy has not been expanded due to the translation because the translation is aligned to the voxel grid.

An indication of the translation applied to a hierarchy is stored so that the true position of the hierarchy can be determined when it is needed. There are different ways in which the indications of translations can be stored and managed. For example, the translation unit 510 can be used as a management unit to keep track of the translations applied to each hierarchy and store the indications of the translations in a table. Then whenever a processing unit (e.g. the intersection testing unit 304) processes the hierarchy based on the spatial position of the hierarchy, the translation unit 510 can provide the indication of the translation for the hierarchy to the processing unit, so that the hierarchy can be processed correctly. In other examples, the indications of translations may be stored with the data for the nodes of the hierarchy, rather than in a separate table. In this case, the translation indication is provided with the spatial position of the nodes of a hierarchy. However, the node data is used and stored frequently in a ray tracing renderer, so increasing the amount of data associated with the nodes may not be desired. This is an implementation choice, and in general any suitable method of storing the indications of the translations may be used, provided that the indications are accessible when the spatial positions of nodes of the hierarchy are to be used.

So, in relation to the translation of a hierarchy, there may be provided a method of processing a hierarchy for use in rendering a scene, wherein the hierarchy is a multi-level linked structure of nodes relating to boxes within the scene, and wherein the hierarchy represents spatial positions of a set of one or more objects to be rendered in the scene, the spatial positions being defined with respect to an origin for the hierarchy, the method comprising:

determining a translation for the hierarchy for positioning the hierarchy within the scene, wherein the translation is determined to be at the granularity of a voxel corresponding to a box relating to a node at a determined level of the hierarchy; and storing an indication of the determined translation for the hierarchy.

As described above, the rendering of the scene may comprise performing ray tracing using the hierarchy. The ray tracing may comprise performing intersection testing of rays against nodes of the hierarchy. The indication of the translation for the hierarchy may be used to translate the spatial positions of the set of one or more objects represented by the hierarchy, the intersection testing being performed using the translated spatial positions. Therefore, the intersection testing can be performed using the translated spatial positions, to thereby determine which (if any) rays intersect primitives describing the set of one or more objects. As described above, the boxes may correspond to voxels representing levels of an oct-tree, and the boxes may be axis-aligned bounding boxes.

The translation may be determined for the hierarchy in accordance with a condition that the hierarchy remains within predetermined spatial extents of the scene. A translation unit (e.g. translation unit 510) may be configured to track the translation of the hierarchy (e.g. by storing the indication of the determined translation for the hierarchy in a table), and to indicate the translation of the hierarchy to a further processing module (e.g. to the intersection testing unit 304) which is to perform processing based on the spatial positions represented by the hierarchy.

In other examples, the indication of the determined translation for the hierarchy is stored with the spatial positions of the objects represented by the hierarchy, such that when a further processing module (e.g. the intersection testing unit 304) is to perform processing based on the spatial positions represented by the hierarchy, the determined translation is taken into account.

In some examples, the determined level of the hierarchy (at which the granularity of the translation is determined) is the top level of the hierarchy.

In other examples, the hierarchy is merged with one or more other hierarchies to form a merged hierarchy, the merging of the hierarchies being performed using the determined translation for the hierarchy. In these examples, the determined level of the hierarchy (at which the granularity of the translation is determined) is a merging level at which the hierarchies are merged to form the merged hierarchy.

As described above, the scene may be a current frame of a sequence of frames. Furthermore, as described above, at least one of the hierarchies may be a static hierarchy which represents spatial positions of a set of one or more static objects and which is reused from a previous frame, and wherein at least another one of the hierarchies may be a dynamic hierarchy which represents spatial positions of a set of one or more dynamic objects and which is built for rendering the current frame.

The methods mentioned above relating to the translation of a hierarchy may be implemented by a translation unit, such as the translation unit 510, but other translation units may be used in some examples.

In particular, there may be provided a translation unit for processing a hierarchy for use in rendering a scene, wherein the hierarchy is a multi-level linked structure of nodes relating to boxes within the scene, and wherein the hierarchy represents spatial positions of a set of one or more objects to be rendered in the scene, the spatial positions being defined with respect to an origin for the hierarchy, wherein the translation unit is configured to:

determine a translation for the hierarchy for positioning the hierarchy within the scene, the translation being at the granularity of a voxel corresponding to a box relating to a node at a determined level of the hierarchy; and cause an indication of the determined translation for the hierarchy to be stored.

For example, the translation unit may comprise a store which is configured to store the indication of the determined translation. In other examples, the indication of the determined translation may be sent from the translation unit for storage in a different unit, e.g. for storage in the memory 308.

In some other examples, a logical unit for assembling spatial index structures is provided. As with examples described above, these other methods relate to creating tree and tree-like data structures to accelerate the process of retrieving data from a database, and in particular a 3d spatial database of primitives. In particular, ray tracing often makes use of a spatial acceleration structure. An acceleration structure may take the form of a 3-dimensional grid, a tree of splitting planes such as a kd-tree, a hierarchy of bounding volumes such as an axis-aligned bounding box hierarchy, or a geometrically defined structure such as an oct-tree. Collectively each of these acceleration structures can be generalized to a graph and many properties are shared among all acceleration structures.

An alternate type of spatial acceleration structure is a signed distance field. A signed distance field is often stored as a grid or sparse voxel structure containing scalar values indicating the distance in space from the center point of the respective cell to the nearest geometry.

The uses of acceleration structures is not limited to ray tracing. Acceleration structures are often used for other types of database queries including the retrieval of one or more points which may be employed in a photon mapping or point-based rendering algorithm.

Constructing acceleration structures is a memory intensive process. The highest quality acceleration structures are created by completely sorting all objects in the database, but trade-offs exist whereby bounded sort operations can produce reasonable quality structures with reduced cost.

A system for spatial queries for use within graphical rendering consists of two components: building an acceleration structure and traversing the structure with specified queries. Acceleration structure building occurs when a shader pipeline outputs geometric primitives intended for an object in memory indexed by an acceleration structure in response to an API call. Traversal occurs when a shader program enqueues one or more queries associated with an acceleration structure. Additional shaders may be enqueued in response to the results of the traversal process.

There is provided a method of constructing an acceleration structure comprising:
 receiving, through an API, descriptions of primitives;
 for each primitive:
  determining characteristics of the primitive;
  selecting one or more groups among a set of active groups based on the characteristics; and
  updating each selected active group; and
 for each active group:
  outputting information for the active group;
  selecting a parent active group; and
  updating the parent active group.

The above method wherein primitives may comprise any of: points, lines, vertices, triangles, nurbs, patches, particles, photons, boxes, voxels, discs, spheres, parametric surfaces, parametric volumes.

The above method wherein characteristics may comprise any of: size, spatial position, orientation, aspect ratio, surface area to volume ratio, alignment to one or more axis or vector, primitive type, normal vector.

The above method wherein the active groups are a finite set.

The above method wherein active groups exist in a physically constrained memory such as an on-chip memory.

The above method wherein the set of active groups are managed using cache-like behaviours.

The above method wherein the updating comprises appending a reference to the primitive to the active group.

The above method wherein the updating comprises modifying a second primitive associated with the active group to bound the primitive.

The above method wherein the updating comprises calculating a distance between the primitive and a spatial position associated with the active group, comparing the calculated distance with a second distance associated with the active group, and potentially updating the second distance.

The above method wherein the information may comprise: references to primitives, memory addresses, distances, shapes, primitive data.

Morton Code Sorter.

A computer implemented method and apparatus for 3d rendering for:
 executing a plurality of shader program instances each instance operable to enqueue queries specifying one or more acceleration structures;
 each query being operable to search the acceleration structure wherein the searching behaviour can be dictated by properties of the acceleration structure and properties of the query; each query operable to invoke one or more shader program instances in response to results of the search.

The above method and apparatus wherein the specified acceleration structure may be a node within a larger acceleration structure.

The above method and apparatus wherein the invoked shader is able to atomically modify data associated with the extant query.

The above method and apparatus wherein the invoked shader is able to resume traversal of an extant query.

The above method and apparatus wherein a query may comprise a ray and the result may comprise the triangle intersected by the ray nearest to the ray's origin.

The above method and apparatus wherein the query may comprise a ray and the query result may be any of: boxes, spheres, triangles, surfaces, volumes The above method and apparatus wherein the query may comprise a radial search outward from a point.

The above method and apparatus wherein the query may comprise a volume, and the results may comprise points.

The above method and apparatus wherein the traversal process is partially breadth-first.

The above method and apparatus wherein the traversal process is asynchronous with respect to the shader execution.

The above method and apparatus wherein the shader program invoked by the query is first enqueued and wherein only one shader enqueued by a given query can execute simultaneously.

The above method and apparatus wherein the shader invocations are ordered based on a criteria for suitability.

The above method and apparatus wherein the criteria for suitability can include the distance from the query's point of origin.

The above method and apparatus wherein the query keeps a reference counter to track the number of enqueued shaders pertaining to the query The above method and apparatus wherein the query keeps a reference counter to track the number of nodes of an acceleration structure that require testing.

The above method and apparatus wherein shaders are operable to modify the reference counters associated with queries.

Figure 16:
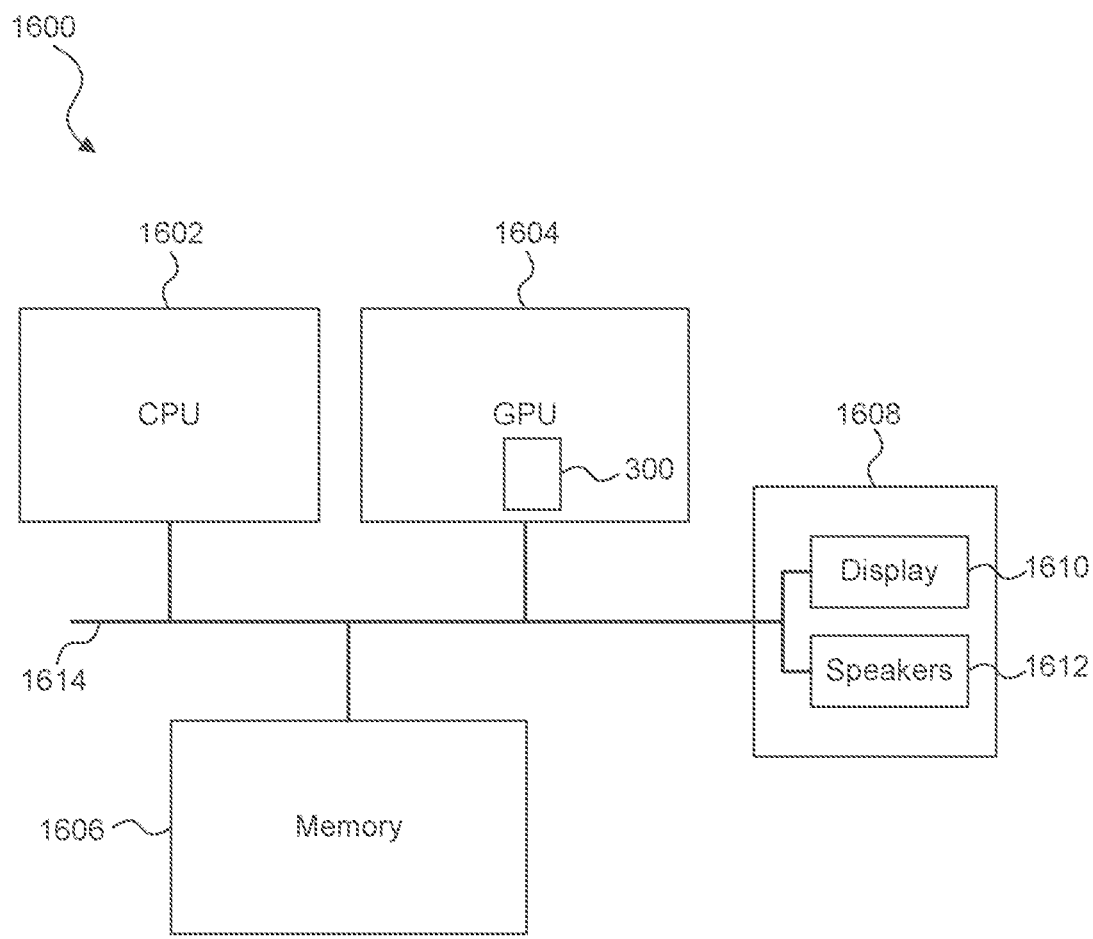
FIG. 16 shows a computer system in which a hierarchy merging module is implemented.

The graphics processing system 300 described above can be implemented in a computer system within a device, e.g. a mobile device such as a mobile phone or tablet. For example, FIG. 16 shows a computer system which comprises a CPU 1602, a GPU 1604 and a memory 1606, wherein the memory 1606 may include the memory 308 described above which includes the hierarchy store 310 and the accumulation buffer 312. The computer system 1600 also comprises other devices 1608, such as a display 1610 and speakers 1612. The components of the computer system 1600 can communicate with each other via a communications bus 1614. Computer program code for an application may be stored in the memory 1606, and may for example be executed on the CPU 1602. If the application needs to render an image of a 3D scene, the primitives can be sent to the GPU 1604, and the GPU 1604 can render the scene as described above using the graphics processing system 300.

In examples described above the hierarchy processing module 302 is implemented in hardware so that it can generate and/or merge hierarchies efficiently in terms of processing power, time and silicon area of the module 302. However, generally, any of the functions, methods, techniques or components described above (e.g. the hierarchy processing module 302 and its components) can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof. The hierarchy processing modules described herein may be embodied in hardware on an integrated circuit. The hierarchy processing modules described herein may be configured to perform any of the methods described herein.

The hierarchy processing modules shown in the figures are shown as comprising a number of functional blocks. This is schematic only and is not intended to define a strict division between different logic elements of such entities. Each functional block may be provided in any suitable manner. It is to be understood that intermediate values described herein as being formed by a hierarchy processing module need not be physically generated by the hierarchy processing module at any point and may merely represent logical values which conveniently describe the processing performed by the hierarchy processing module between its input and output.

In the case of a software implementation of the hierarchy processing module 302, the units and modules implemented therein represent program code that perform specified tasks when executed on a processor. In one example, the units and modules of the system 300 may be implemented by a computer configured with software in machine readable form stored on a computer-readable medium. One such configuration of a computer-readable medium is a signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods described herein may be carried out by a dedicated circuit, an application-specific integrated circuit, a programmable logic array, a field-programmable gate array, or the like. For example, the module, functionality, component, unit or logic (e.g. the hierarchy processing module 302 and its components) may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, unit or logic (e.g. the hierarchy processing module 302 and its components) may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a hierarchy merging module configured to perform any of the methods described herein, or to manufacture a hierarchy merging module comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a hierarchy merging module will now be described with respect to FIG. 17.

Figure 17:
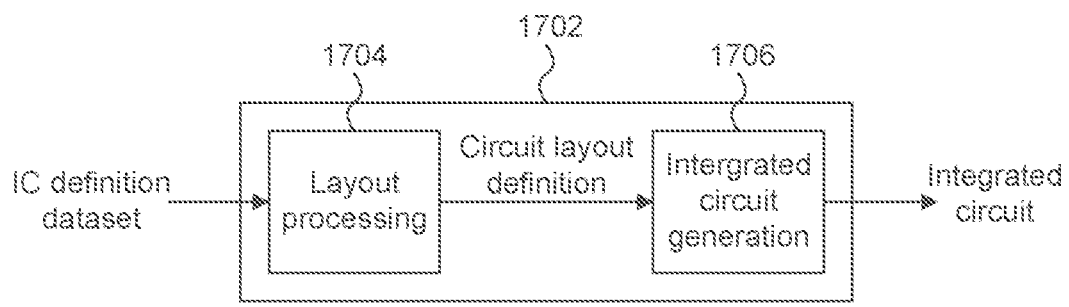
FIG. 17 shows an integrated circuit manufacturing system for generating an integrated circuit embodying a hierarchy merging module.

FIG. 17 shows an example of an integrated circuit (IC) manufacturing system 1702 which comprises a layout processing system 1704 and an integrated circuit generation system 1706. The IC manufacturing system 1702 is configured to receive an IC definition dataset (e.g. defining a hierarchy merging module as described in any of the examples herein), process the IC definition dataset, and generate an IC according to the IC definition dataset (e.g. which embodies a hierarchy merging module as described in any of the examples herein). The processing of the IC definition dataset configures the IC manufacturing system 1702 to manufacture an integrated circuit embodying a hierarchy merging module as described in any of the examples herein.

The layout processing system 1704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1704 has determined the circuit layout it may output a circuit layout definition to the IC generation system 1706. A circuit layout definition may be, for example, a circuit layout description.

The IC generation system 1706 generates an IC according to the circuit layout definition, as is known in the art. For example, the IC generation system 1706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1706 may be in the form of computer-readable code which the IC generation system 1706 can use to form a suitable mask for use in generating an IC.

The different processes performed by the IC manufacturing system 1702 may be implemented all in one location, e.g. by one party. Alternatively, the IC manufacturing system 1702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a hierarchy merging module without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 17 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 17, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

What is claimed is:

1. A method of processing a hierarchy for use in rendering a scene, wherein the hierarchy is a multi-level linked structure of nodes relating to boxes within the scene, and wherein the hierarchy represents spatial positions of a set of one or more objects to be rendered in the scene, the spatial positions being defined with respect to an origin for the hierarchy, the method comprising:
   determining a spatial translation to be applied for the hierarchy for moving a position of the hierarchy within a spatial representation of the scene, wherein the spatial translation is determined to be at the granularity of a dimension of a voxel corresponding to a box relating to a node at a determined level of the hierarchy; and
   storing an indication of the determined spatial translation for the hierarchy.

2. The method as claimed in claim 1, wherein the rendering of the scene comprises performing ray tracing using the hierarchy.

3. The method as claimed in claim 2, wherein the ray tracing comprises performing intersection testing of rays against nodes of the hierarchy.

4. The method as claimed in claim 3, wherein the indication of the translation for the hierarchy is used to translate the spatial positions of the set of one or more objects represented by the hierarchy, the intersection testing being performed using the translated spatial positions.

5. The method as claimed in claim 4, wherein the intersection testing is performed using the translated spatial positions, to thereby determine which rays intersect primitives describing the set of one or more objects.

6. The method as claimed in claim 1, wherein:
   the boxes correspond to voxels representing levels of an oct-tree, and the boxes are axis-aligned bounding boxes.

7. The method as claimed in claim 1, wherein the translation is determined for the hierarchy in accordance with a condition that the hierarchy remains within predetermined spatial extents of the scene.

8. The method as claimed in claim 1, further comprising using a translation unit to:
   track the translation of the hierarchy; and, indicate the translation of the hierarchy to a further processing module which is to perform processing based on the spatial positions represented by the hierarchy.

9. The method as claimed in claim 8, wherein the translation unit is configured to track the translation of the hierarchy by storing the indication of the determined translation for the hierarchy in a table.

10. The method as claimed in claim 8, wherein the further processing module comprises an intersection testing unit.

11. The method as claimed claim 1, wherein the indication of the determined translation for the hierarchy is stored with the spatial positions of the objects represented by the hierarchy, such that when a further processing module is to perform processing based on the spatial positions represented by the hierarchy, the determined translation is taken into account.

12. The method as claimed in claim 1, wherein the determined level of the hierarchy is the top level of the hierarchy.

13. The method as claimed claim 1, wherein the hierarchy is merged with one or more other hierarchies to form a merged hierarchy, the merging of the hierarchies being performed using the determined translation for the hierarchy.

14. The method as claimed in claim 13, wherein the determined level of the hierarchy is a merging level at which the hierarchies are merged to form the merged hierarchy.

15. The method as claimed in claim 1, wherein the scene comprises a current frame of a sequence of frames.

16. The method as claimed in claim 13, wherein at least one of the hierarchies is a static hierarchy which represents spatial positions of a set of one or more static objects and which is reused from a previous frame, and wherein at least another one of the hierarchies is a dynamic hierarchy which represents spatial positions of a set of one or more dynamic objects and which is built for rendering the current frame.

17. A translation unit for processing a hierarchy for use in rendering a scene, wherein the hierarchy is a multi-level linked structure of nodes relating to boxes within the scene, and wherein the hierarchy represents spatial positions of a set of one or more objects to be rendered in the scene, the spatial positions being defined with respect to an origin for the hierarchy, wherein the translation unit is configured to:

determine a spatial translation for the hierarchy for moving a position of the hierarchy within a spatial representation of the scene, the spatial translation being at the granularity of a dimension of a voxel corresponding to a box relating to a node at a determined level of the hierarchy; and cause an indication of the determined spatial translation for the hierarchy to be stored.

18. The translation unit as claimed in claim 17, comprising a store which is configured to store the indication of the determined translation.

19. The translation unit as claimed in claim 17, wherein the indication of the determined translation is sent from the translation unit for storage in a different unit.

20. The translation unit as claimed in claim 19, wherein the different unit comprises memory comprising a hierarchy store.

* * * * *